US012085874B2

(12) United States Patent
Okamoto

(10) Patent No.: US 12,085,874 B2
(45) Date of Patent: Sep. 10, 2024

(54) EDGE REGULATING MEMBER, BELT ROTATION DEVICE, AND IMAGE FORMING DEVICE

(71) Applicant: SHARP KABUSHIKI KAISHA, Sakai (JP)

(72) Inventor: Shohtaroh Okamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/109,380

(22) Filed: Feb. 14, 2023

(65) Prior Publication Data

US 2023/0266698 A1 Aug. 24, 2023

(30) Foreign Application Priority Data

Feb. 18, 2022 (JP) ................................ 2022-024030

(51) Int. Cl.
*G03G 15/00* (2006.01)
*G03G 15/16* (2006.01)

(52) U.S. Cl.
CPC .................. *G03G 15/1615* (2013.01); *G03G 2215/00151* (2013.01); *G03G 2215/00156* (2013.01)

(58) Field of Classification Search
CPC ............. G03G 15/161; G03G 15/1615; G03G 2215/00143; G03G 2215/00151; G03G 2215/00156
See application file for complete search history.

(56) References Cited

U.S. PATENT DOCUMENTS

2016/0282790 A1* 9/2016 Iwakoshi .............. B65H 5/021

FOREIGN PATENT DOCUMENTS

JP 2017-142543 A 8/2017

* cited by examiner

*Primary Examiner* — Hoang X Ngo
(74) *Attorney, Agent, or Firm* — ScienBiziP, P.C.

(57) ABSTRACT

An edge regulating member provided in a belt rotation device that tensions a belt via a belt tensioning roller and rotates the belt in a rotation direction includes a body that comes into contact with an inner surface of the belt and a regulating portion that extends, at a position adjacent to the body, further outward in a radial direction of the belt tensioning roller than the body, and comes into contact with an edge of the belt. Tension of the belt acting on the body while the inner surface of the belt is in contact with the body causes the regulating portion to tilt, turned outward in the rotation axis direction from a fold-back portion of the belt toward an upstream side in the rotation direction.

17 Claims, 30 Drawing Sheets

EDGE REGULATING MEMBER, BELT ROTATION DEVICE, AND IMAGE FORMING DEVICE

TECHNICAL FIELD

The disclosure relates to an edge regulating member that regulates misalignment movement of a belt, a belt rotation device that rotates a belt, and an image forming device, examples of which include a copy machine, a multi-function printer, a printer, and a facsimile machine.

BACKGROUND ART

A belt rotation device uses belt tensioning rollers to apply tension to a belt and rotate the belt in a rotation direction. The belt may become misaligned in a rotation axis direction of the belt tensioning rollers while being rotated by the belt tensioning rollers due to various factors. This belt misalignment can be prevented from progressing to a point where the belt slips off from the belt tensioning rollers by providing an edge regulating member in a rotatable manner on the rotary shaft of each belt tensioning roller.

However, in such a belt rotation device, the belt may become damaged when the edge of the belt slides against the regulating portions of the edge regulating members. To reduce the load on the edge of the belt when the edge portion slides against the regulating portions of the edge regulating members, the sliding friction between the regulating portion and the edge portion of the belt when the belt is misaligned needs to be maximally reduced.

To solve this problem, a belt rotation device has been proposed having a configuration including an inclined flange roller (edge regulating member) attached in a rotatable manner to an inclined roller shaft having an inclined shaft portion inclined with respect to the rotary shaft of the roller. In this device, the inclined flange roller is rotated together with the belt so that sliding friction between a flange surface (regulating portion) of the inclined flange roller and the edge of the belt is maximally reduced.

SUMMARY

Technical Problem

The belt rotation device including the inclined flange roller as described above requires an additional component, i.e., the inclined roller shaft having the inclined flange roller. Further, the inclined roller shaft needs to be fixed to a rotary shaft of a roller. This makes the configuration complex.

An object of the disclosure is to provide, in a simple configuration, an edge regulating member that can maximally reduce sliding friction between a regulating portion and an edge of a belt when the belt is misaligned, a belt rotation device, and an image forming device.

Solution to Problem

To solve the problem described above, an edge regulating member, a belt rotation device, and an image forming device are provided as follows.

(1) Edge Regulating Member

An edge regulating member according to the disclosure is an edge regulating member included in a belt rotation device that tensions a belt via a belt tensioning roller and rotates the belt in a rotation direction, the edge regulating member being provided in a rotatable manner on a rotary shaft of the belt tensioning roller to regulate misalignment movement of the belt in a rotation axis direction of the belt tensioning roller, including: a body that comes into contact with an inner surface of the belt; and a regulating portion that extends, at a position adjacent to the body, further outward in a radial direction of the belt tensioning roller than the body and comes into contact with an edge of the belt, wherein tension of the belt acting on the body while the inner surface of the belt is in contact with the body causes the regulating portion to tilt, turned outward in the rotation axis direction from a fold-back portion of the belt toward an upstream side in the rotation direction.

(2) Belt Rotation Device

A belt rotation device according to the disclosure is a belt rotation device, including: a belt;

a belt tensioning roller that tensions the belt and rotates the belt in a rotation direction; and an edge regulating member provided in a rotatable manner on a rotary shaft of the belt tensioning roller to regulate misalignment movement of the belt in a rotation axis direction of the belt tensioning roller, wherein the edge regulating member includes a body that comes into contact with an inner surface of the belt, and a regulating portion that extends further outward in a radial direction of the belt tensioning roller than the body and comes into contact with an edge of the belt, and tension of the belt acting on the body while the inner surface of the belt is in contact with the body causes the regulating portion to tilt, turned outward in the rotation axis direction from a fold-back portion of the belt toward an upstream side in the rotation direction.

(3) Image Forming Device

An image forming device according to the disclosure is an image forming device including the belt rotation device according to the disclosure.

Advantage Effects of Disclosure

According to the disclosure, with a simple configuration, sliding friction between a regulating portion and an edge of a belt when the belt is misaligned can be maximally reduced.

DESCRIPTION OF EMBODIMENTS

An embodiment according to the disclosure will be described below with reference to the drawings. In the following description, the same components are denoted by the same reference signs. The names and functions of the components are also the same. Accordingly, detailed descriptions are not repeated.

Overall Image Forming Device

Figure 1:
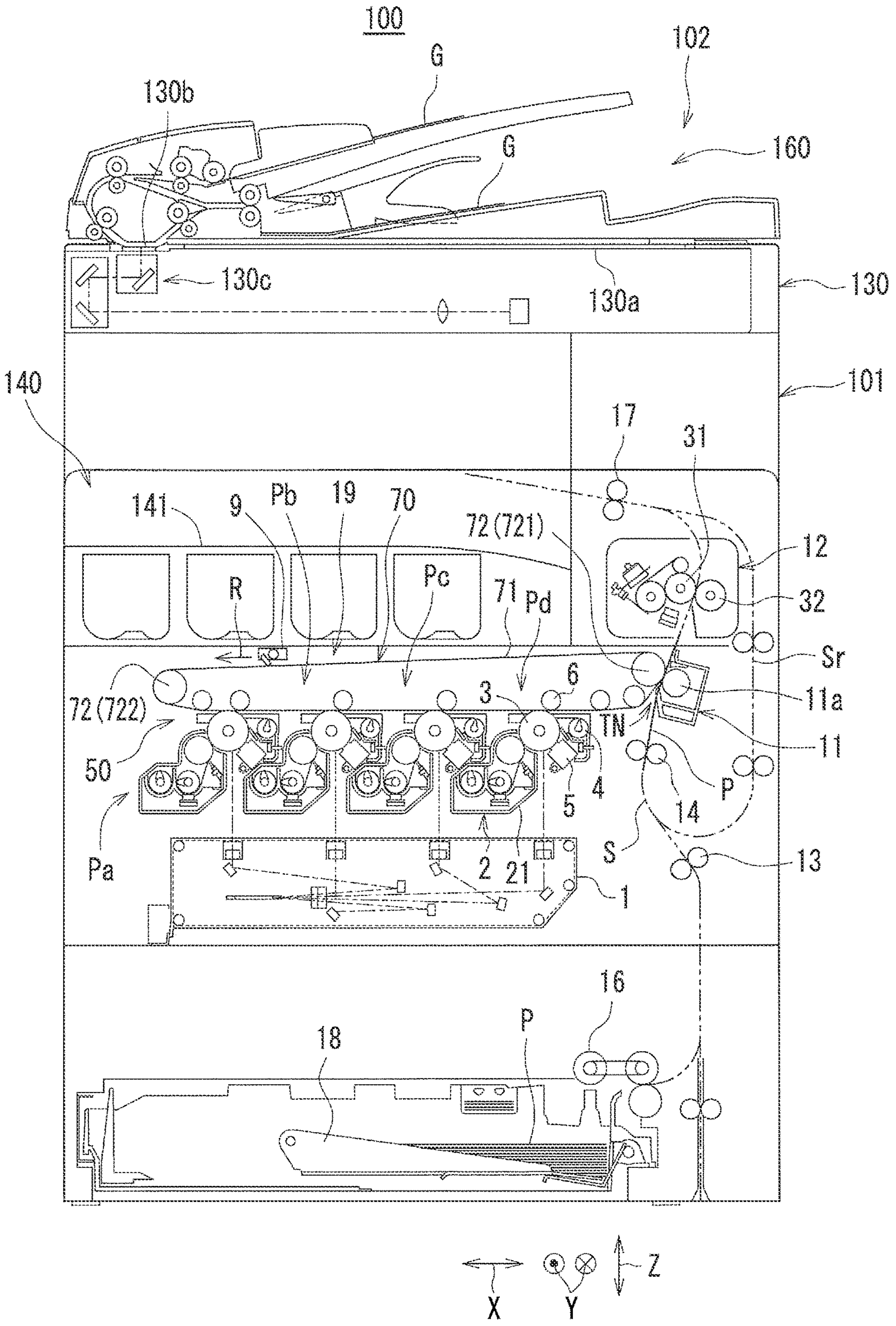
FIG. 1 is a cross-sectional view illustrating a schematic configuration of an image forming device according to an embodiment.

FIG. 1 is a cross-sectional view illustrating a schematic configuration of an image forming device 100 according to the present embodiment. In the drawings, reference sign X denotes the left-and-right direction, reference sign Y denotes the depth direction (front-and-back direction), and reference sign Z denotes the up-and-down direction.

The image forming device 100 is a multi-function printer that includes an image reading device 102 and has a copy function, a scanner function, a facsimile function, and a printer function. The image forming device 100 transmits an image of a document G read by the image reading device 102 to an external device. On a sheet P such as a paper sheet, the image forming device 100 forms the image of the document G read by the image reading device 102 or an image received from the external device in color or black and white.

A document feeding device 160 supported in an openable/closable manner by an image reader 130 is provided on an upper side of the image reader 130. The image reading device 102 includes the document feeding device 160. The document feeding device 160 conveys one or a plurality of the documents G one at a time. The image reading device 102 reads each of the one or a plurality of documents G conveyed one at a time by using the document feeding device 160. The image reading device 102 also includes a platen 130*a* (document setting platform) on which the document G is placed, and reads a document G placed on the platen 130*a*. The image reader 130 operates a scanning optical system 130*c* so that a document reader 130*b* of the image reader 130 reads the document G placed on the platen 130*a* or reads the document G conveyed by the document feeding device 160 and the image reader 130 generates image data of the document G.

An image forming device body 101 includes an optical scanning device 1, development devices 2 to 2, photoreceptor drums 3 to 3, drum cleaning devices 4 to 4, chargers 5 to 5, a primary transfer belt device 19 provided with a belt rotation device 70, a secondary transfer device 11, a fixing device 12, a sheet conveyance path S, a feed cassette 18, and a sheet discharge tray 141.

The image forming device 100 primarily transfers a toner image formed using toners of a plurality of colors to a belt 71 (a primary transfer belt in this example), and secondarily transfers, to the sheet P, the toner image primarily transferred to the belt 71.

In the present embodiment, image data corresponding to a color image composed of yellow (Y), magenta (M), and cyan (C) or a monochrome image composed of a single color (for example, black (K)) is used. Note that in the following description, yellow, magenta, cyan, and black are simply referred to as Y, M, C, and K, respectively.

An image former 50 of the image forming device 100 is provided with four sets of the development device 2, the photoreceptor drum 3, the drum cleaning device 4, and the charger 5 that form four types of toner images, with each set serving as an image station Pa, Pb, Pc, Pd corresponding to the color Y, M, C, K, respectively.

The optical scanning device 1 exposes the surface of each of the photoreceptor drums 3 to 3 to form an electrostatic latent image. The development devices 2 to 2 develop the surfaces of the photoreceptor drums 3 to 3 where the electrostatic latent images are formed to form toner images on the surfaces of the photoreceptor drums 3 to 3. The drum cleaning devices 4 to 4 remove and collect residual toner on the surfaces of the photoreceptor drums 3 to 3. The chargers 5 to 5 uniformly charge the surfaces of the photoreceptor drums 3 to 3 such that the surfaces of the photoreceptor drums 3 to 3 have a predetermined potential. With this series of operations, toner images of each of the colors are formed on the surfaces of the photoreceptor drums 3 to 3.

The primary transfer belt device 19 includes the belt 71, primary transfer rollers 6 to 6 (primary transfer members), a plurality of belt tensioning rollers 72 to 72 (transfer driving roller 721 and transfer driven roller 722 in this example), and a belt cleaning device 9. The belt 71 and the plurality of belt tensioning rollers 72 to 72 form the belt rotation device 70. Four primary transfer rollers 6 are provided on the inner side of the belt 71, allowing four types of toner images corresponding to the respective colors to be formed on the belt 71. The primary transfer rollers 6 to 6 primarily transfer the toner images of the respective colors formed on the surfaces of the photoreceptor drums 3 to 3 to the belt 71 that rotates in a predetermined rotation direction R. The plurality of belt tensioning rollers 72 to 72 tension the belt 71.

In the secondary transfer device 11, a transfer nip portion TN (transfer nip region) is formed between a secondary transfer roller 11*a* and the belt 71, and the sheet P conveyed along the sheet conveyance path S is conveyed while being nipped at the transfer nip portion TN. When the sheet P passes through the transfer nip portion TN, a toner image on the surface of the belt 71 is secondarily transferred onto the sheet P. Then, the sheet P is conveyed to the fixing device 12. The belt cleaning device 9 removes and collects waste toner that did not transfer to the sheet P and remains on the surface of the belt 71.

The fixing device 12 includes a fixing roller 31 and a pressure roller 32 that sandwich the sheet P and rotate. In the fixing device 12, the sheet P with the transferred toner image is nipped between the fixing roller 31 and the pressure roller 32 and subject to heat and pressure to fix the toner image onto the sheet P.

The feed cassette 18 is provided below the optical scanning device 1 and stores the sheets P to be used for image formation. The sheet P is pulled out from the feed cassette 18 by pickup rollers 16 and conveyed to the sheet conveyance path S. The sheet P conveyed to the sheet conveyance path S is conveyed to discharge rollers 17 via the secondary transfer device 11 and the fixing device 12, and is discharged to the sheet discharge tray 141 at a discharge portion 140. Conveyance rollers 13, registration rollers 14, and the discharge rollers 17 are disposed along the sheet conveyance path S. The conveyance rollers 13 assist the conveyance of the sheet P. The registration rollers 14 temporarily stop the sheet P and align the leading end of the sheet P. The registration rollers 14 convey the temporarily stopped sheet P in synchronization with the timing of the toner image on the belt 71. The toner image on the belt 71 is secondarily transferred onto the sheet P at the transfer nip portion TN between the belt 71 and the secondary transfer roller 11*a*.

Note that while FIG. 1 illustrates a configuration in which one feed cassette 18 is provided; however, no such limitation is intended. A configuration with a plurality of the feed cassettes 18 may be used, with different feed cassettes 18 being loaded with different types of the sheets P.

When the image forming device 100 forms an image on both the front surface and the back surface of the sheet P, the sheet P is conveyed in the reverse direction from the discharge roller 17 to a sheet reverse path Sr. The image forming device 100 inverts the front and back of the sheet P conveyed in the reverse direction and guides the sheet P again to the registration rollers 14. The image forming device 100 forms an image on the back surface of the sheet P guided to the registration roller 14 in a similar manner to when forming an image on the front surface, and discharges the sheet P to the sheet discharge tray 141.

Belt Rotation Device 70

Figure 2:
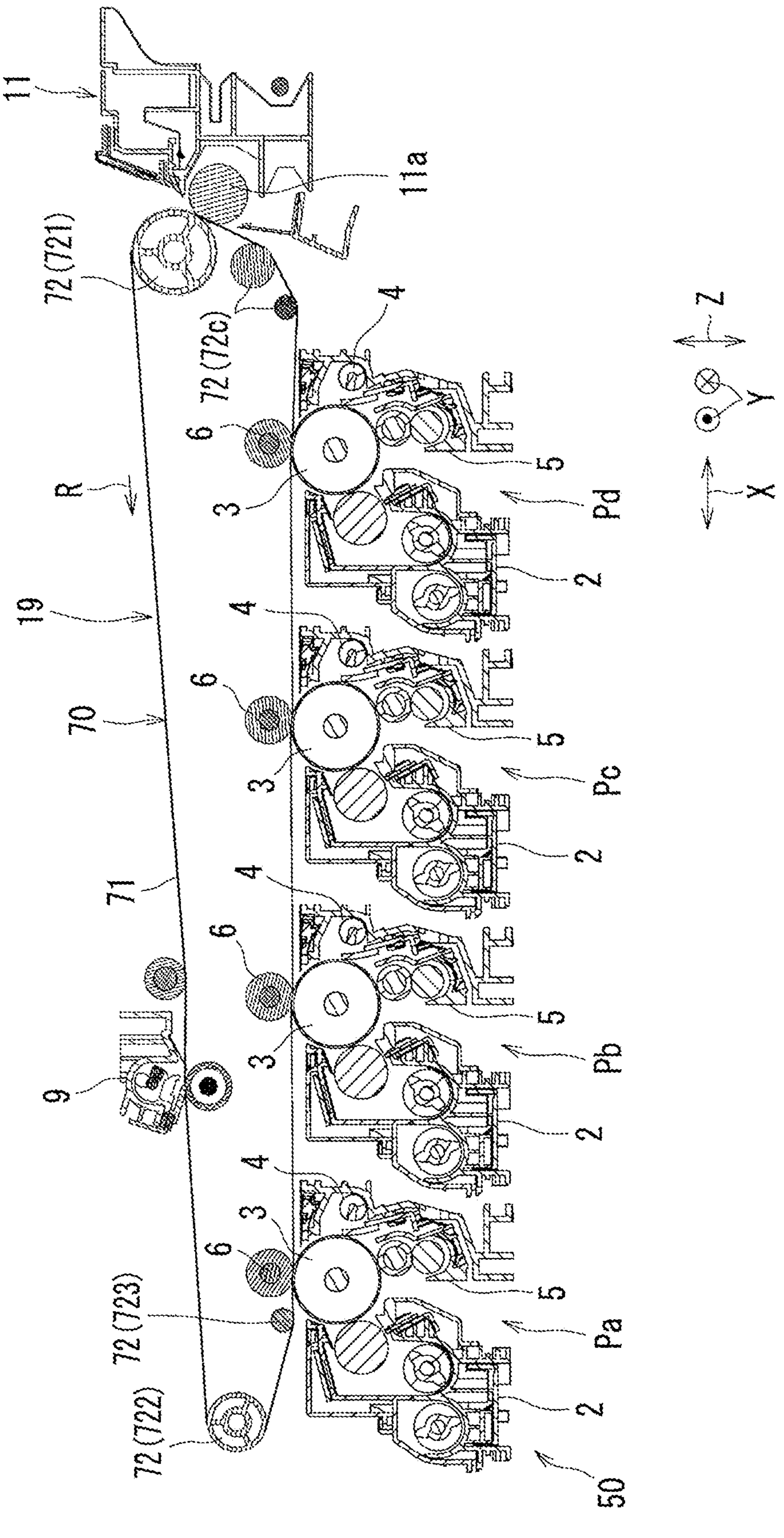
FIG. 2 is a cross-sectional view illustrating an image former, a primary transfer belt device, and a secondary transfer device of the image forming device illustrated in FIG. 1.

FIG. 2 is a cross-sectional view illustrating the image former 50, the primary transfer belt device 19, and the secondary transfer device 11 of the image forming device 100 illustrated in FIG. 1.

Figure 3A:
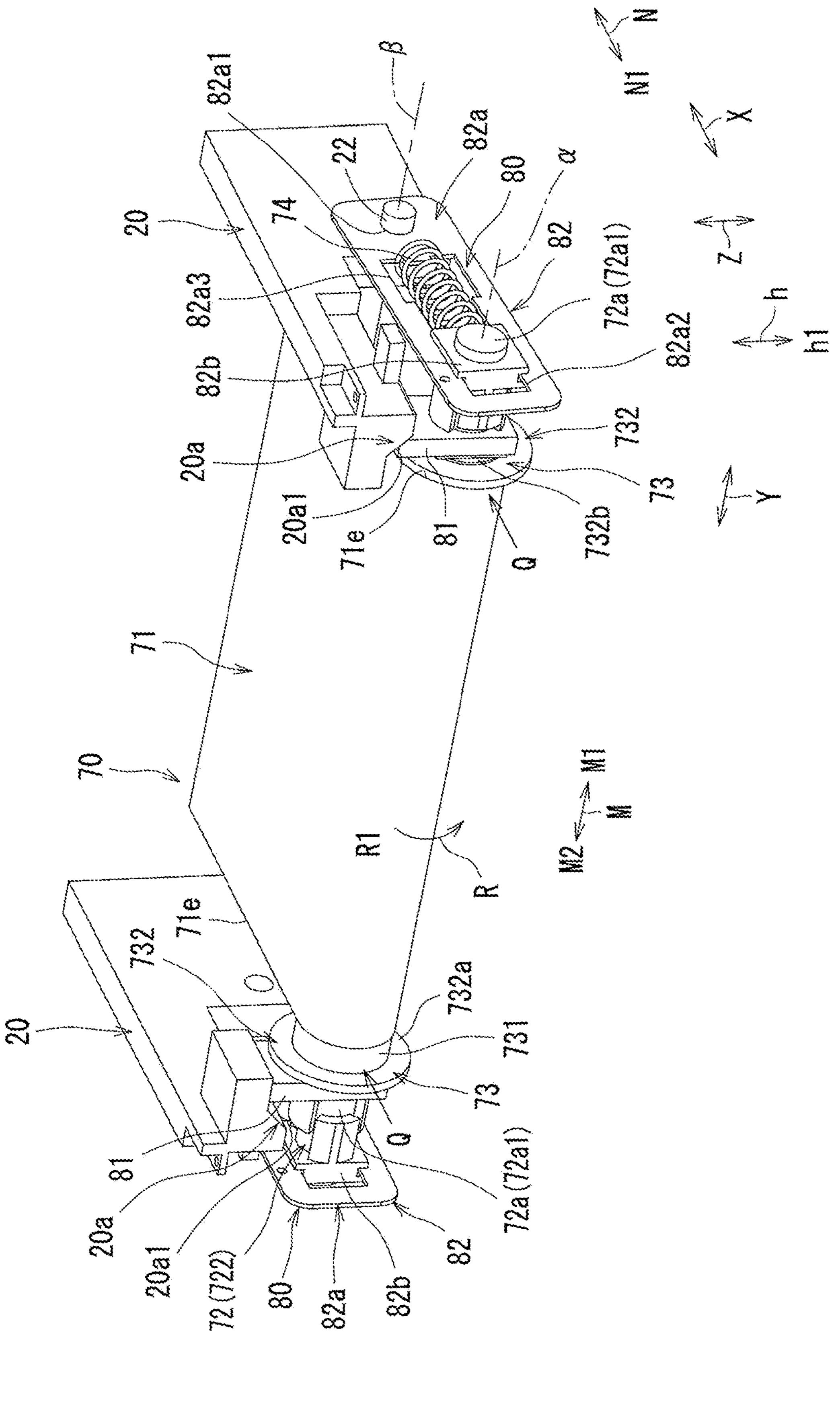
FIG. 3A is a perspective view illustrating misalignment movement of a belt at a first side in a rotation axis direction at a belt tensioning roller portion on a side opposite to the secondary transfer device in a left-and-right direction of a belt rotation device according to a first embodiment.
Figure 3B:
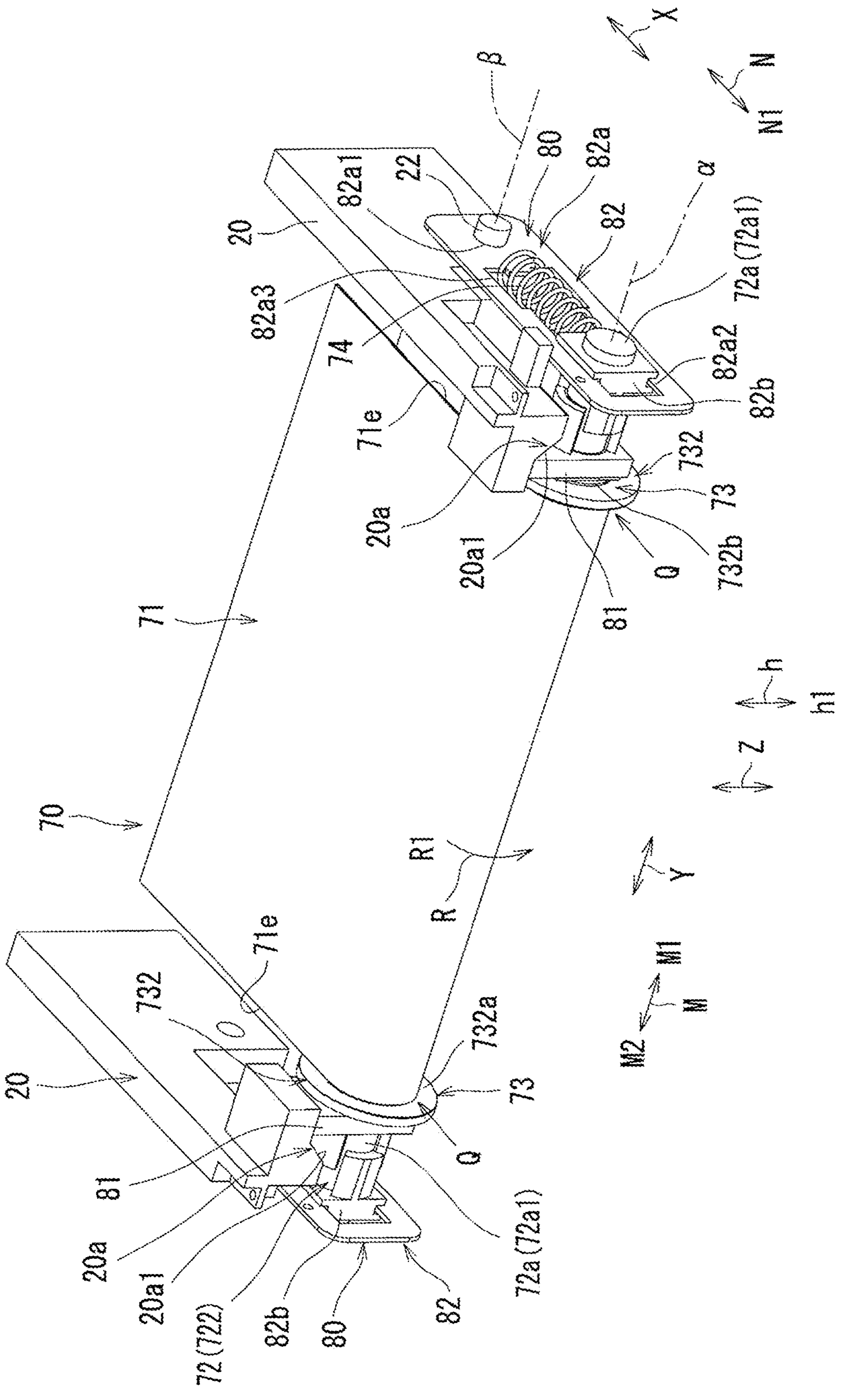
FIG. 3B is a perspective view illustrating misalignment movement of the belt at a second side in the rotation axis direction at the belt tensioning roller portion on the side opposite to the secondary transfer device in the left-and-right direction of the belt rotation device according to the first embodiment.

FIGS. 3A and 3B are perspective views illustrating misalignment movement of the belt 71 at a first side M1 (front side) and a second side M2 (back side) in a rotation axis direction M at a belt tensioning roller 72 (722) portion on the side opposite to the secondary transfer device 11 in the left-and-right direction X of the belt rotation device 70 according to the first embodiment.

Figure 4:
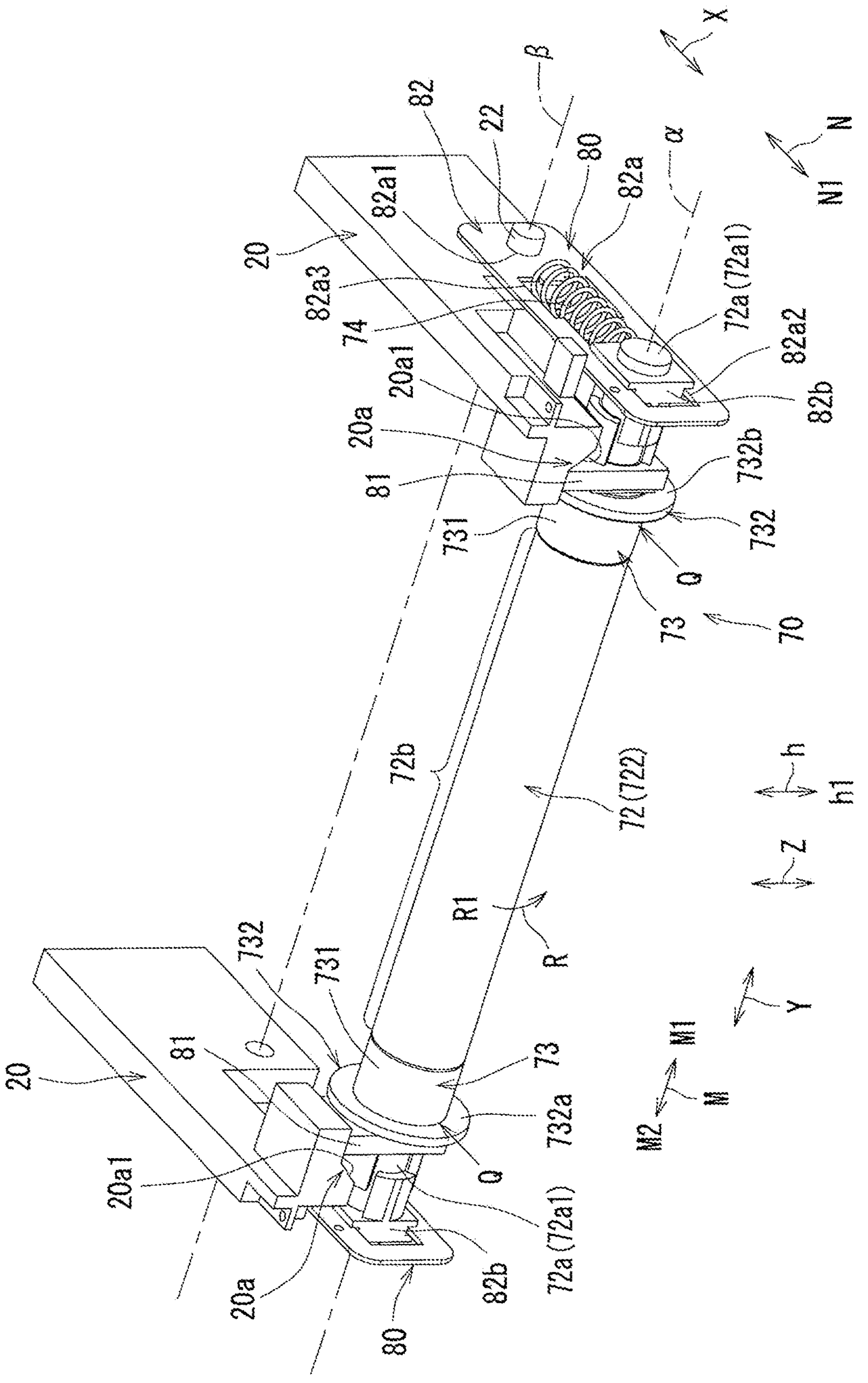
FIG. 4 is a perspective view illustrating the belt rotation device illustrated in FIGS. 3A and 3B with the belt removed.

FIG. 4 is a perspective view illustrating the belt rotation device 70 illustrated in FIGS. 3A and 3B with the belt 71 removed.

Figure 5A:
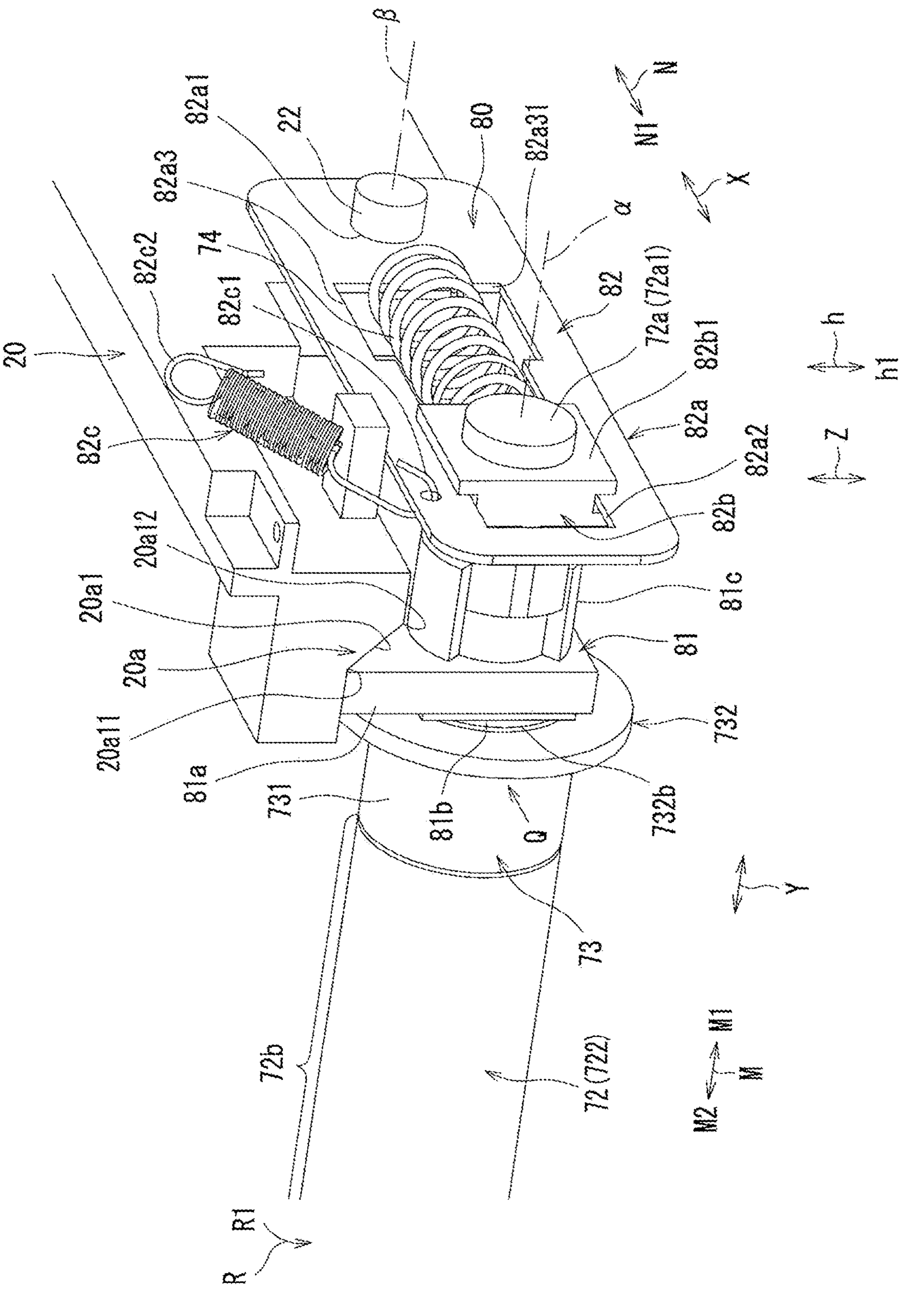
FIG. 5A is a magnified perspective view illustrating an edge regulating member portion of the belt rotation device illustrated in FIG. 4 on the first side in the rotation axis direction.
Figure 5B:
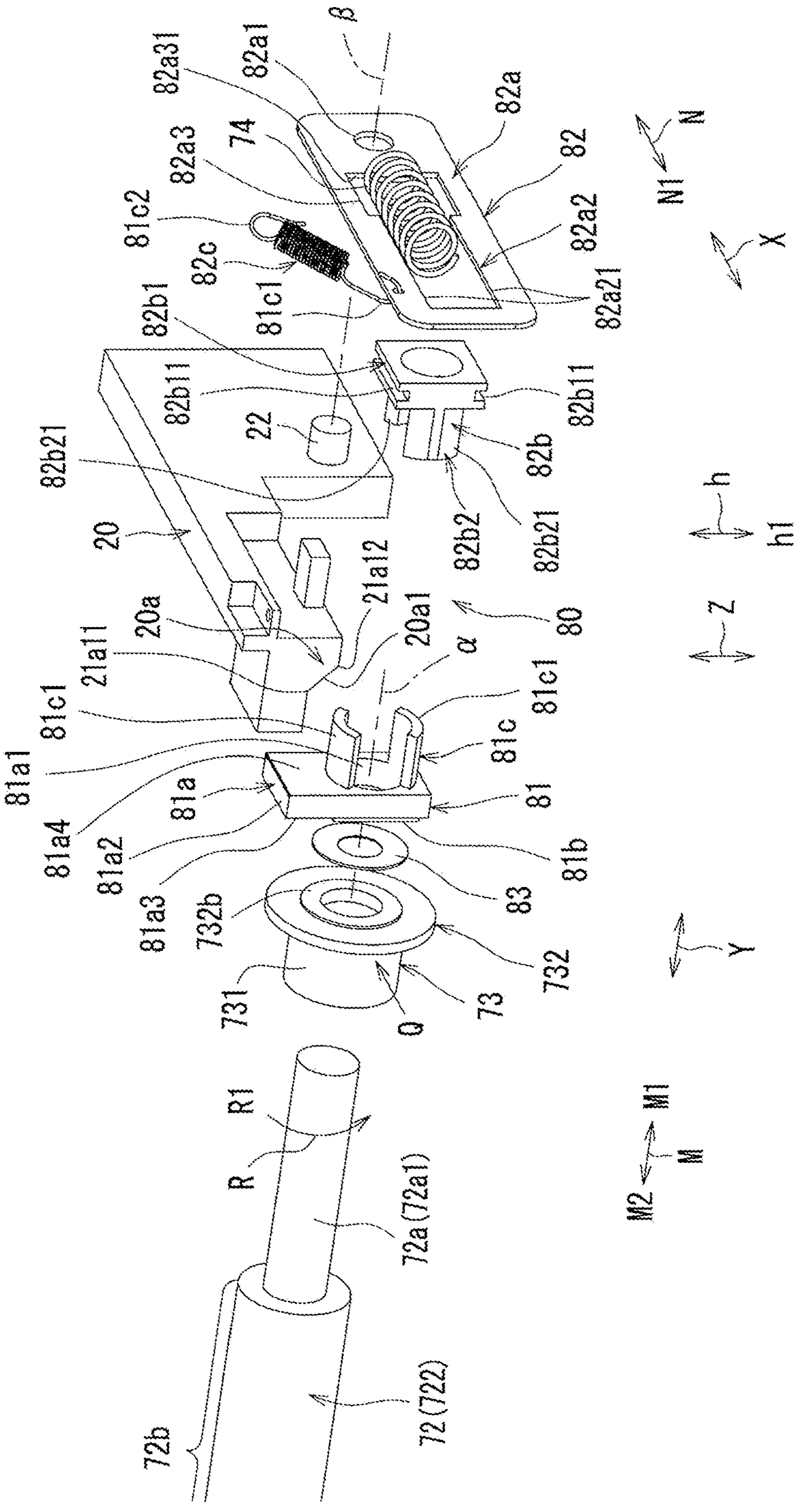
FIG. 5B is a magnified exploded perspective view illustrating the edge regulating member portion of the belt rotation device illustrated in FIG. 4 on the first side of the rotation axis direction.

FIGS. 5A and 5B are a magnified perspective view and a magnified exploded perspective view, respectively, illustrating an edge regulating member 73 portion of the belt rotation device 70 illustrated in FIG. 4 on the first side M1 in the rotation axis direction M.

Figure 6A:
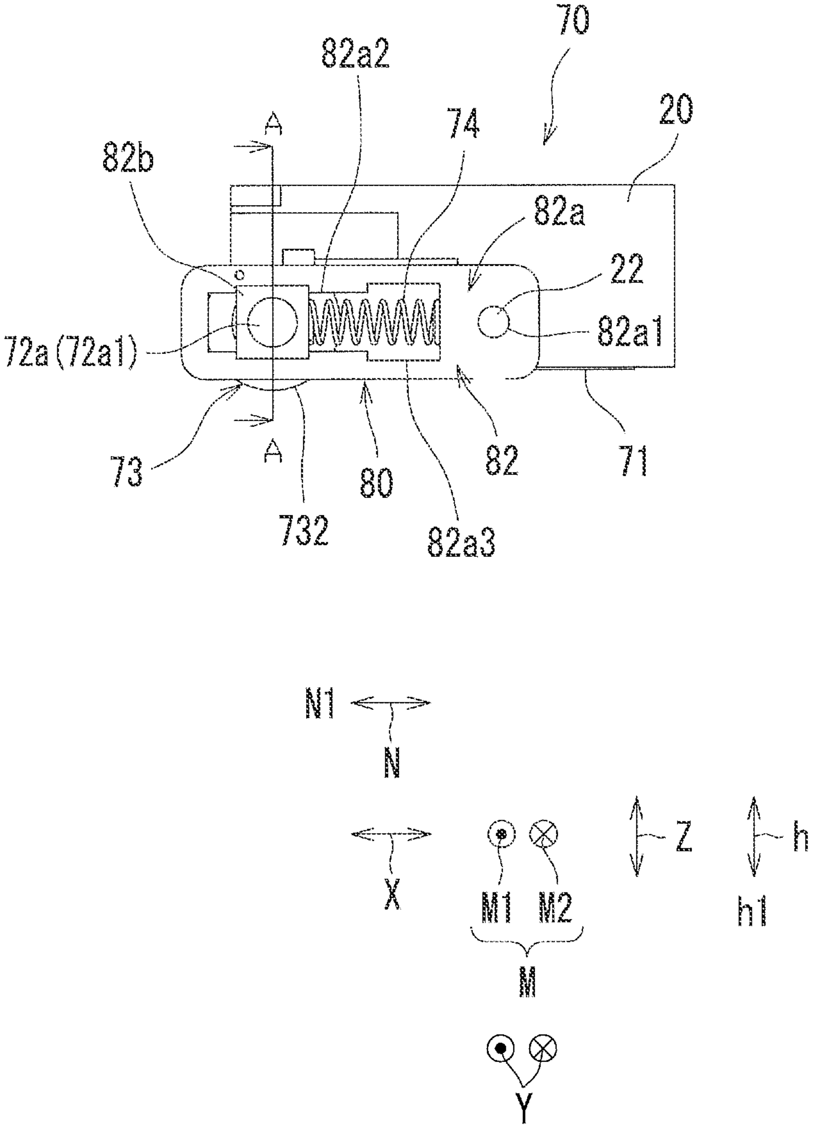
FIG. 6A is a front view of the belt rotation device illustrated in FIG. 3B.
Figure 6B:
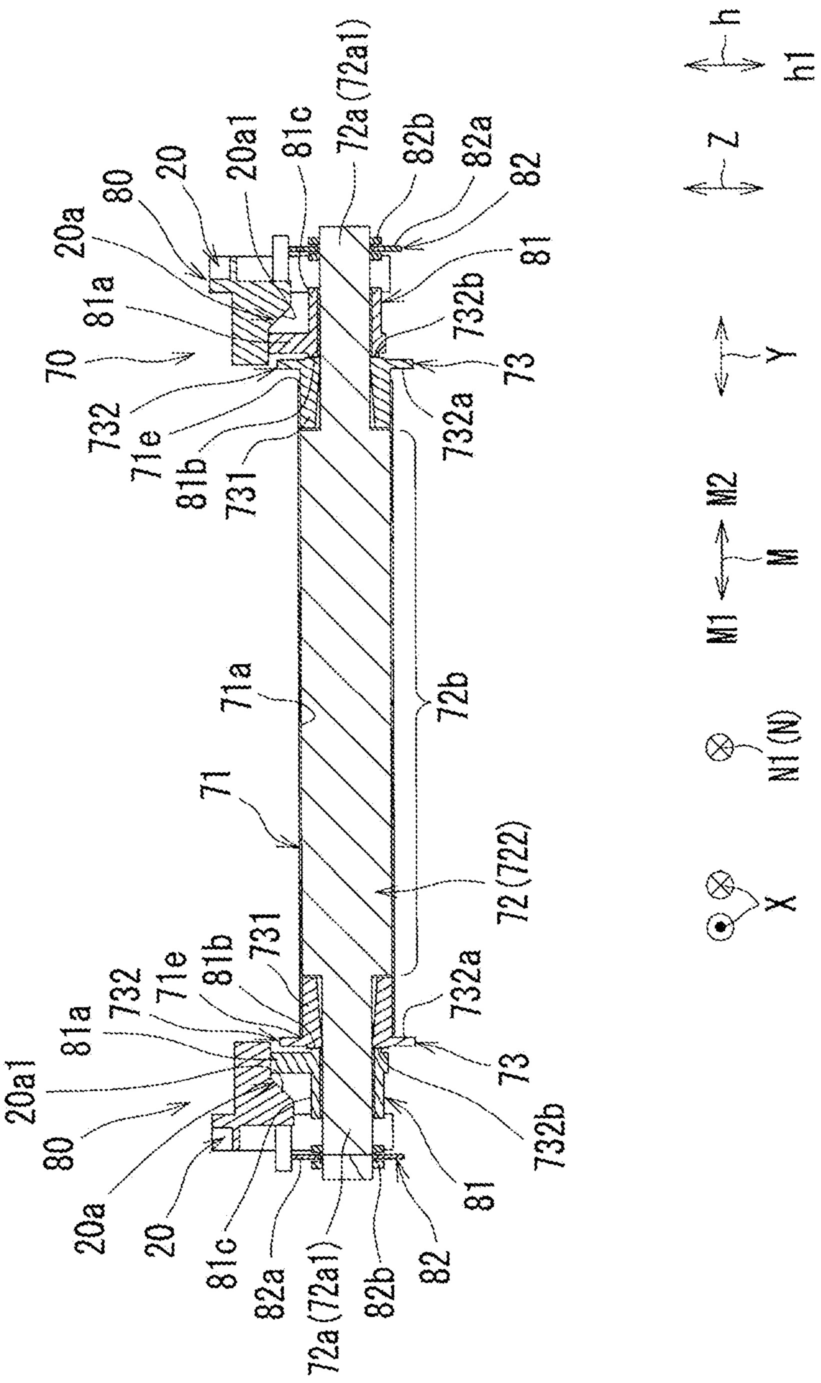
FIG. 6B is a cross-sectional view taken along line A-A in FIG. 6A.
Figure 6C:
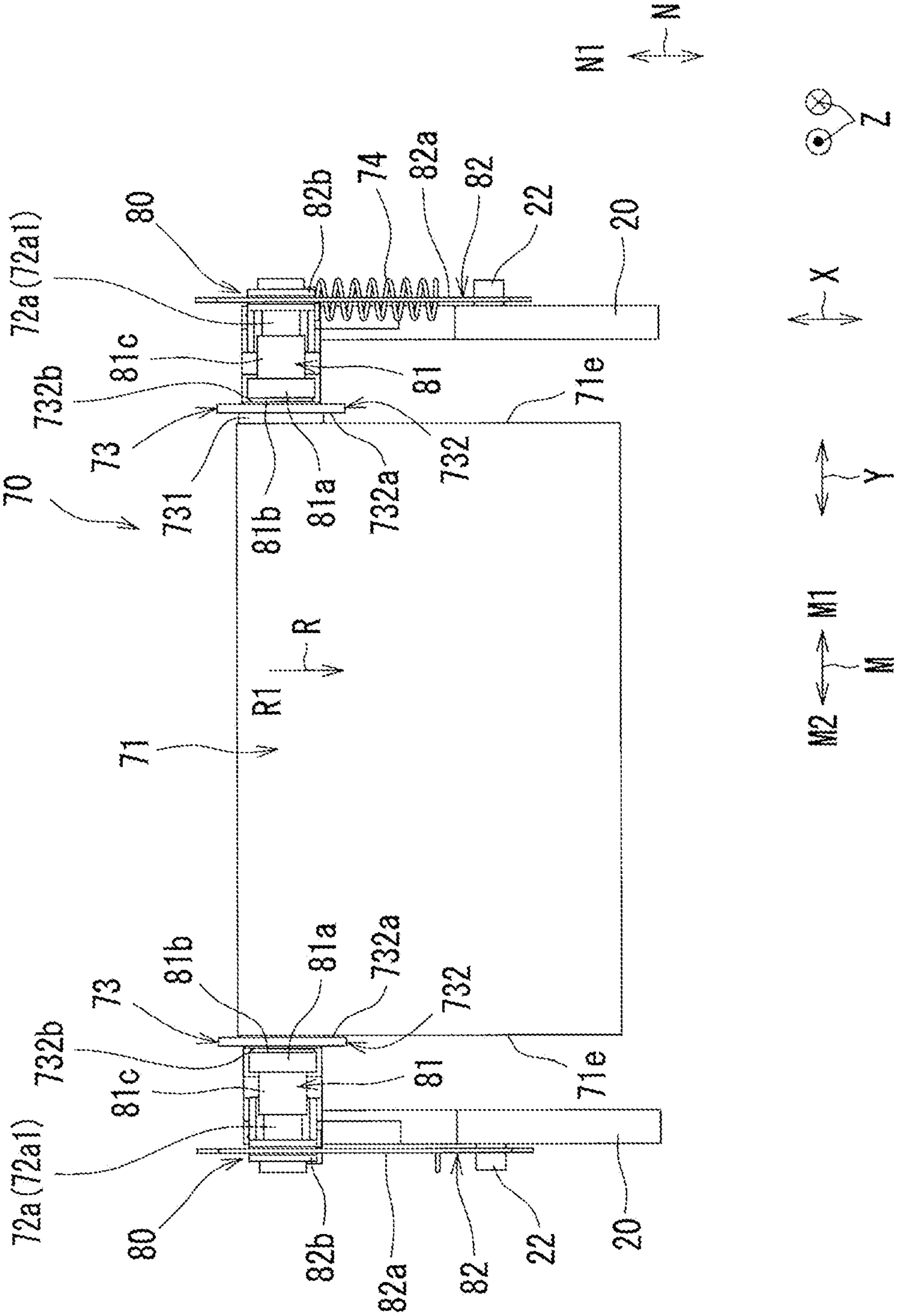
FIG. 6C is a bottom view of the belt rotation device illustrated in FIG. 3B.

FIGS. 6A and 6C are a front view and a bottom view, respectively, of the belt rotation device 70 illustrated in FIG. 3B. FIG. 6B is a cross-sectional view taken along line A-A in FIG. 6A.

Figure 7A:
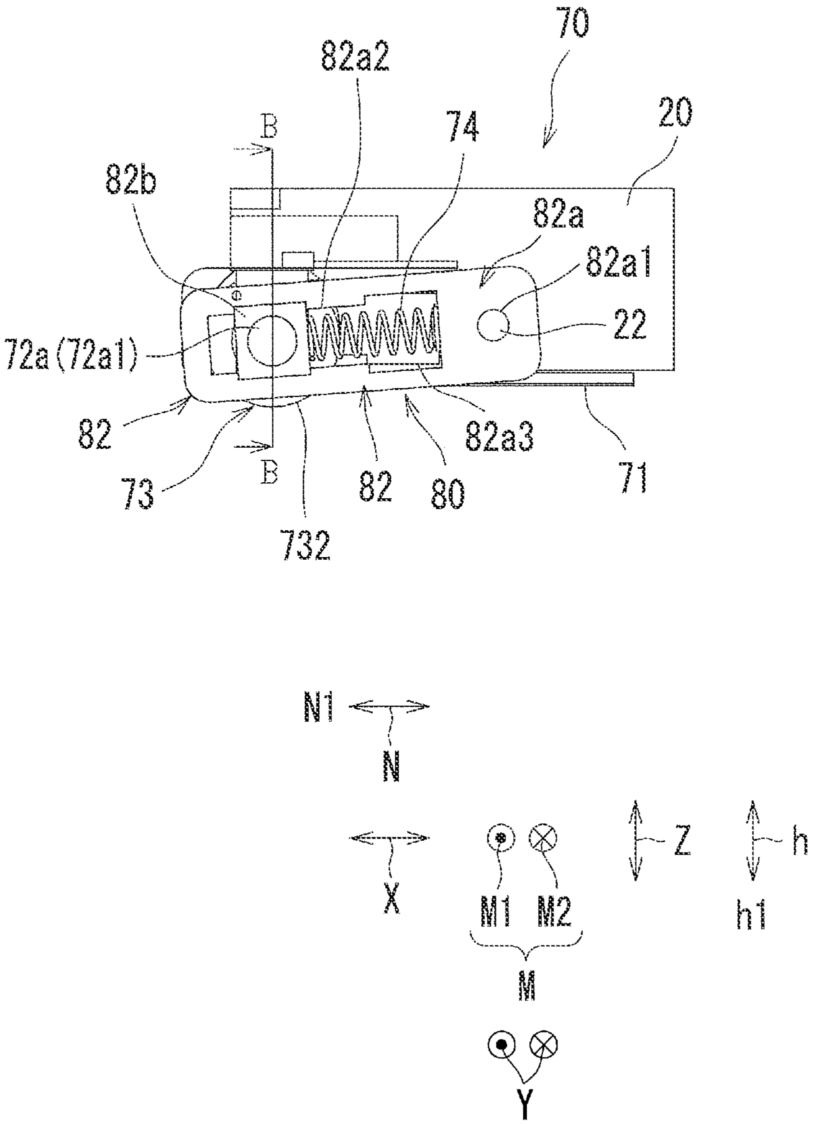
FIG. 7A is a front view illustrating misalignment movement of the belt of the belt rotation device at the first side of the rotation axis direction.
Figure 7B:
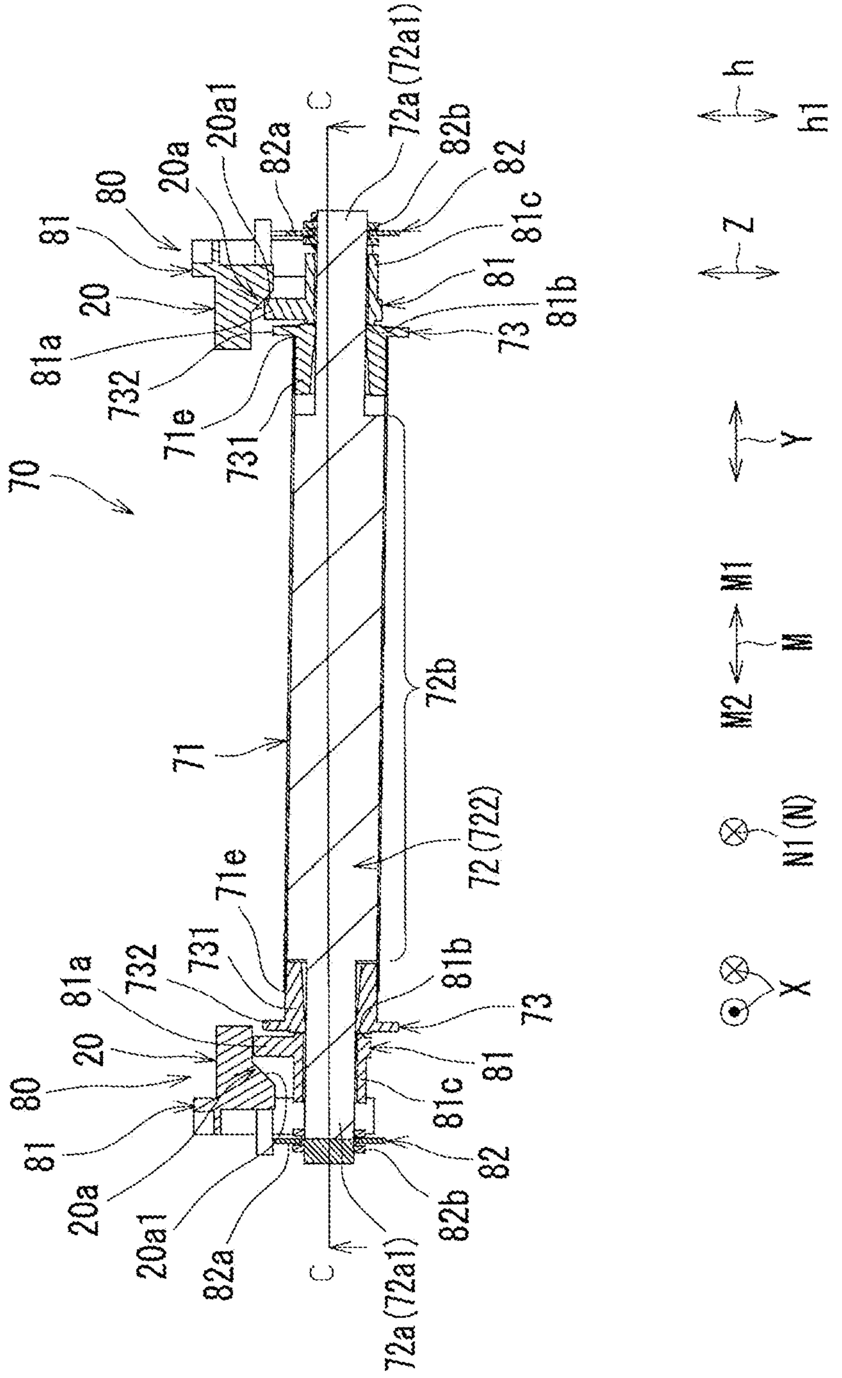
FIG. 7B is a cross-sectional view taken along line B-B in FIG. 7A.
Figure 7C:
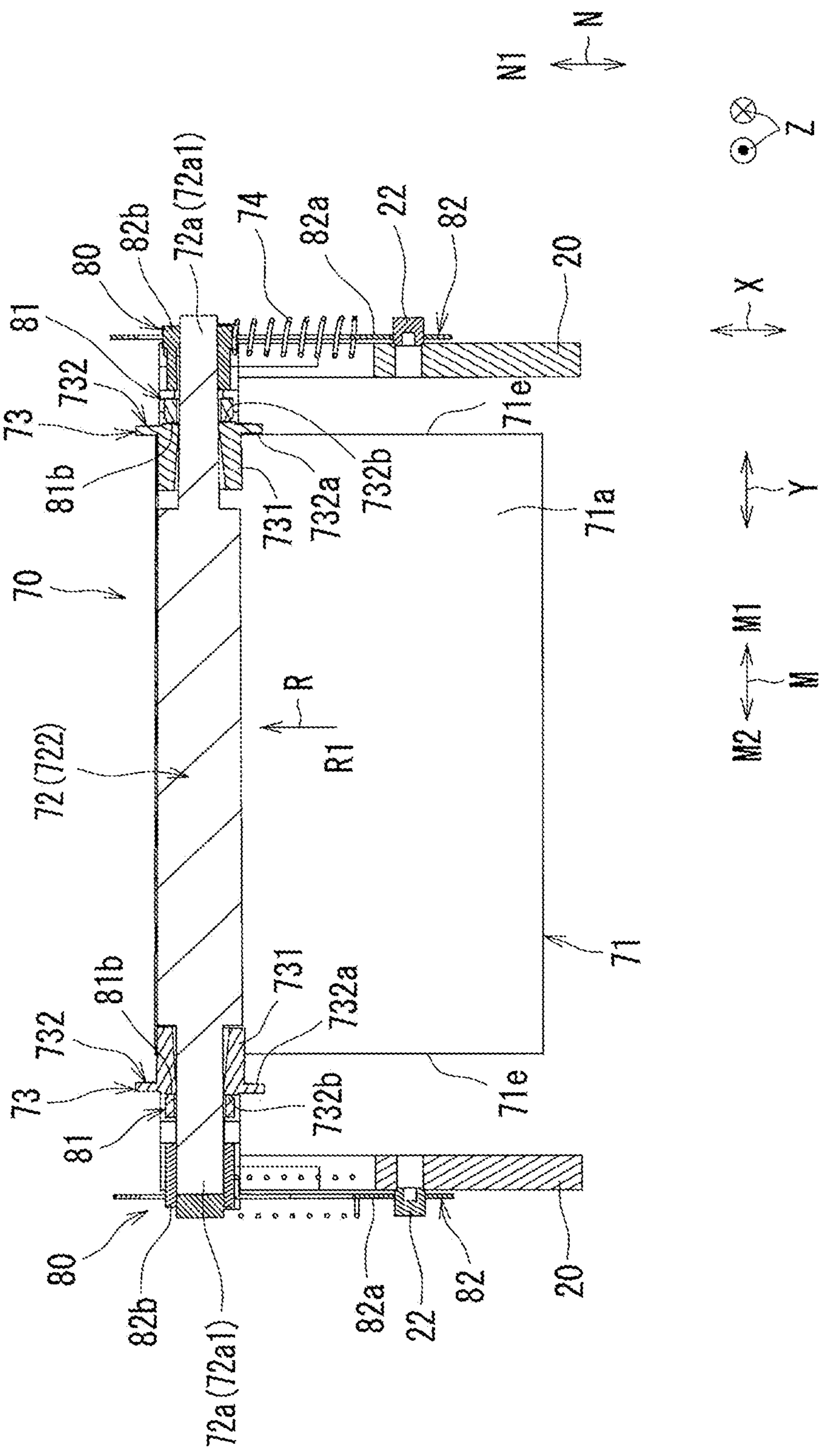
FIG. 7C is a plan view illustrating misalignment movement of the belt of the belt rotation device at the first side in the rotation axis direction.
Figure 7D:
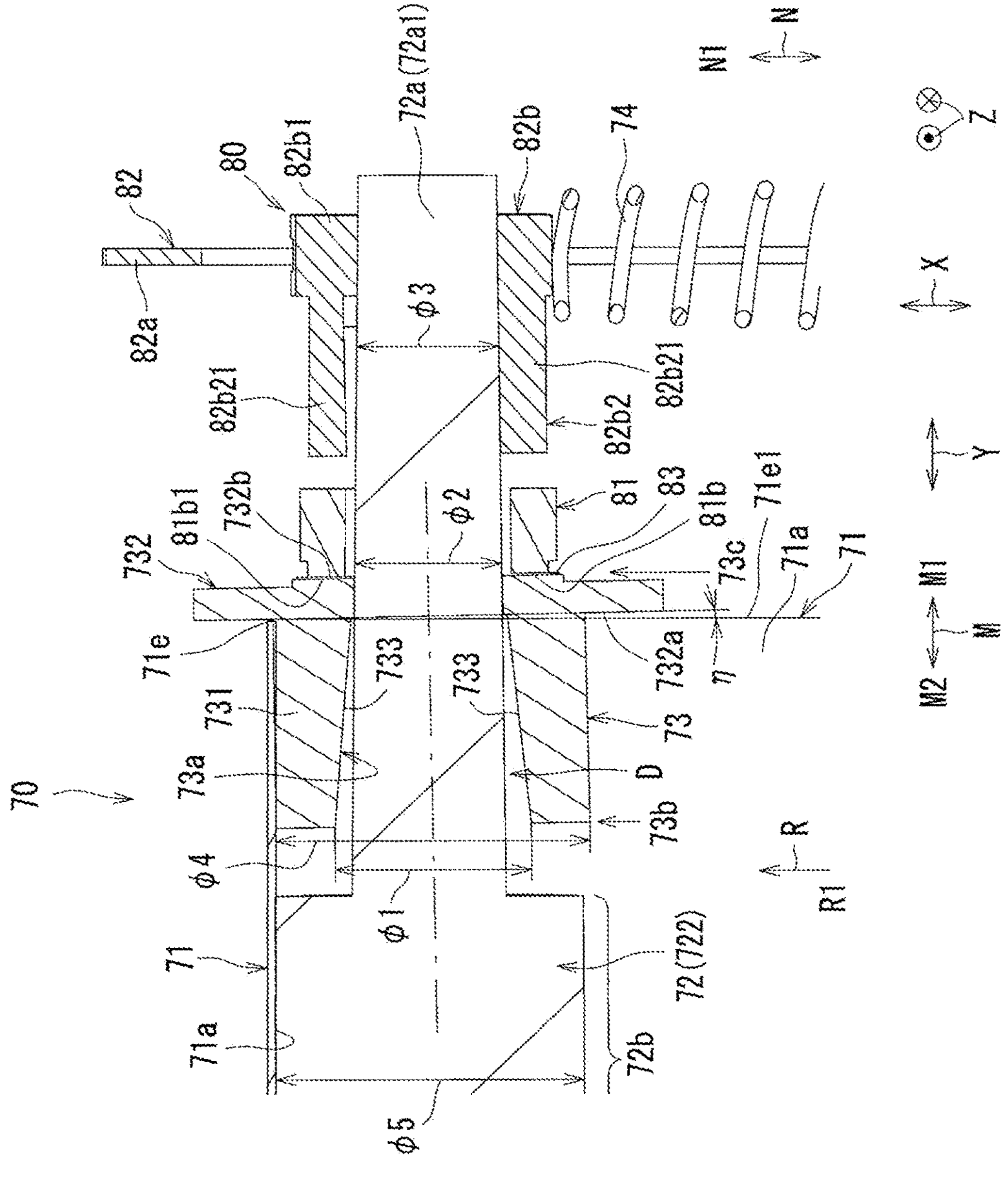
FIG. 7D is a magnified cross-sectional view of the edge regulating member portion on the first side in the rotation axis direction in a cross section taken along line C-C in FIG. 7B.

FIGS. 7A and 7C are a front view and a plan view, respectively, illustrating misalignment movement of the belt 71 of the belt rotation device 70 at the first side M1 of the rotation axis direction M. FIG. 7B is a cross-sectional view taken along line B-B in FIG. 7A. FIG. 7D is a magnified cross-sectional view of the edge regulating member 73 portion on the first side M1 in the rotation axis direction M of a cross section taken along line C-C in FIG. 7B.

Figure 8A:
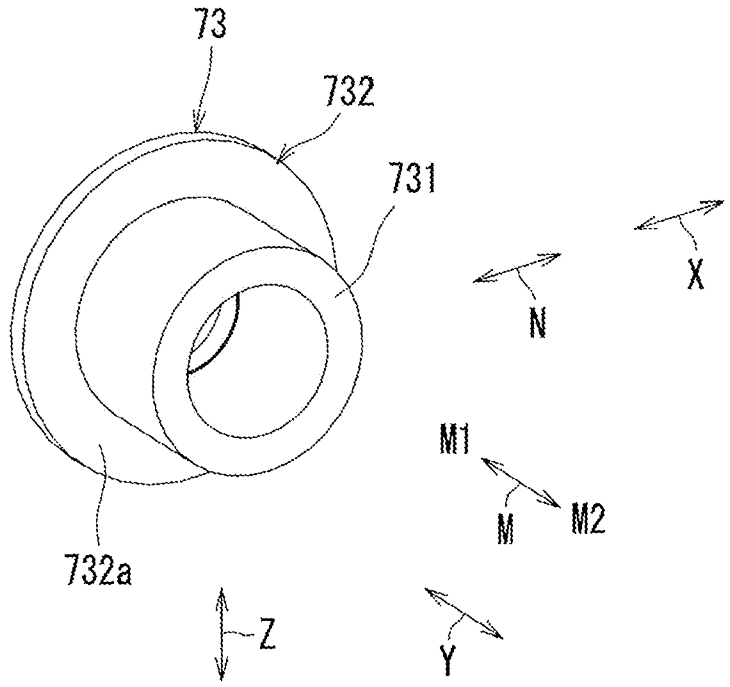
FIG. 8A is a perspective view illustrating the edge regulating member.
Figure 8B:
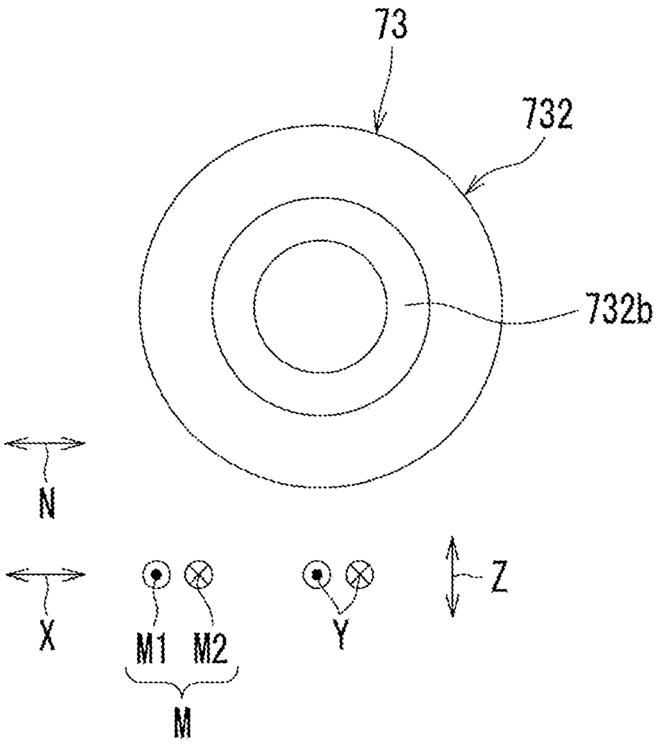
FIG. 8B is a front view of the edge regulating member as seen from the first side in the rotation axis direction.
Figure 8C:
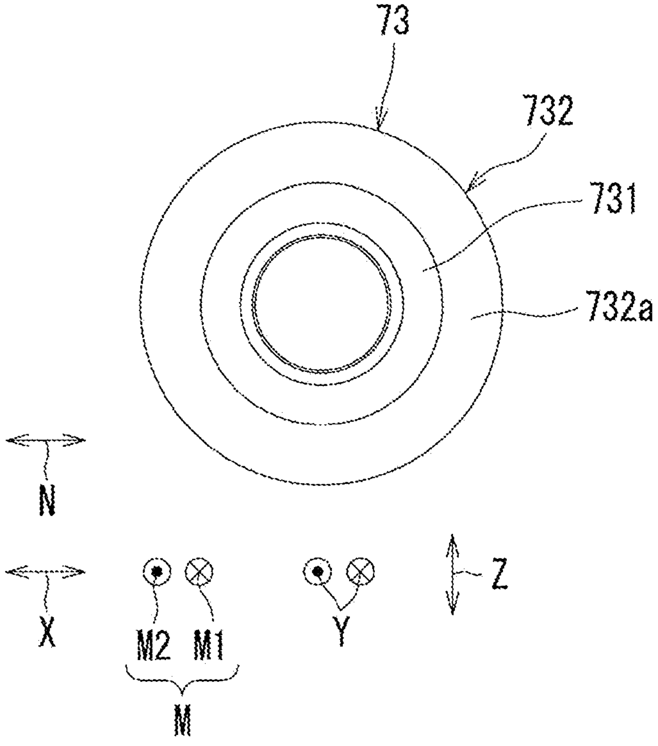
FIG. 8C is a back view of the edge regulating member as seen from the second side in the rotation axis direction.
Figure 8D:
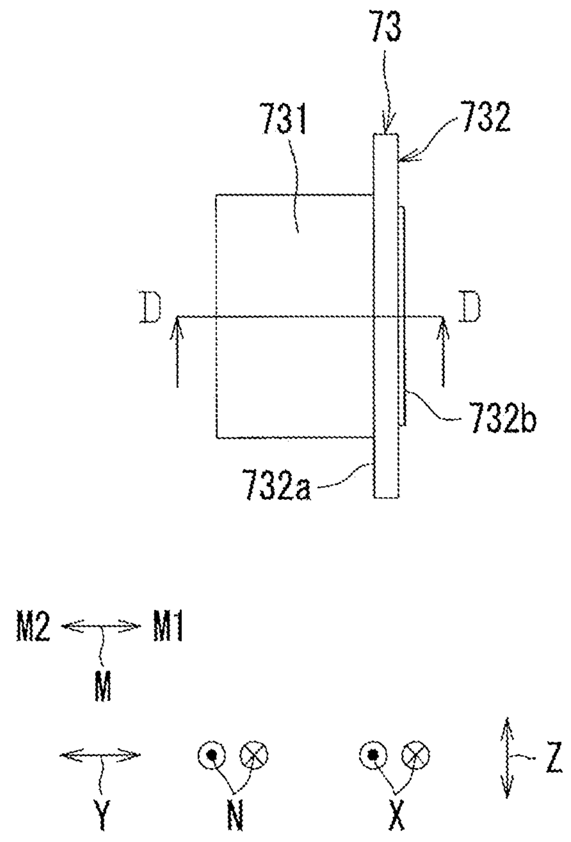
FIG. 8D is a side view of the edge regulating member.
Figure 8E:
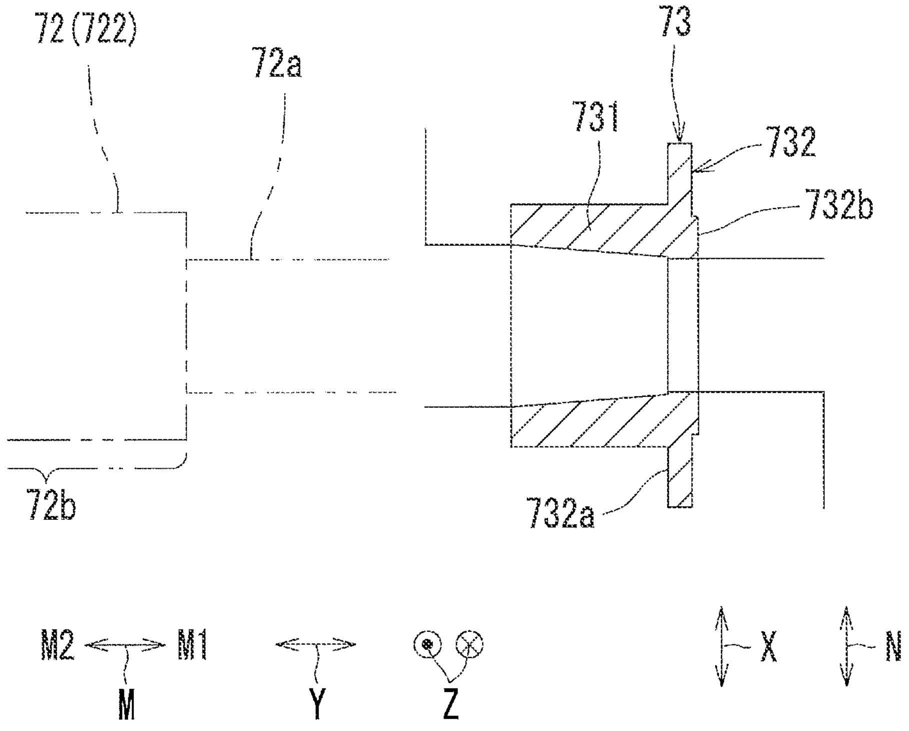
FIG. 8E is a cross-sectional view taken along line D-D in FIG. 8D.
Figure 9A:
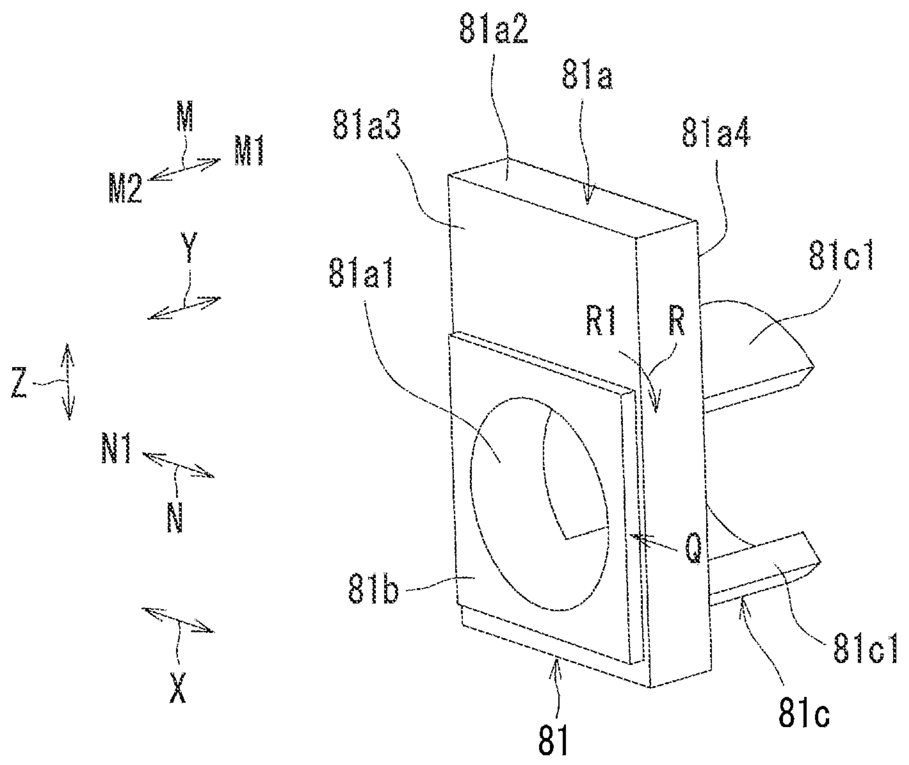
FIG. 9A is a perspective view illustrating a moving member.
Figure 9B:
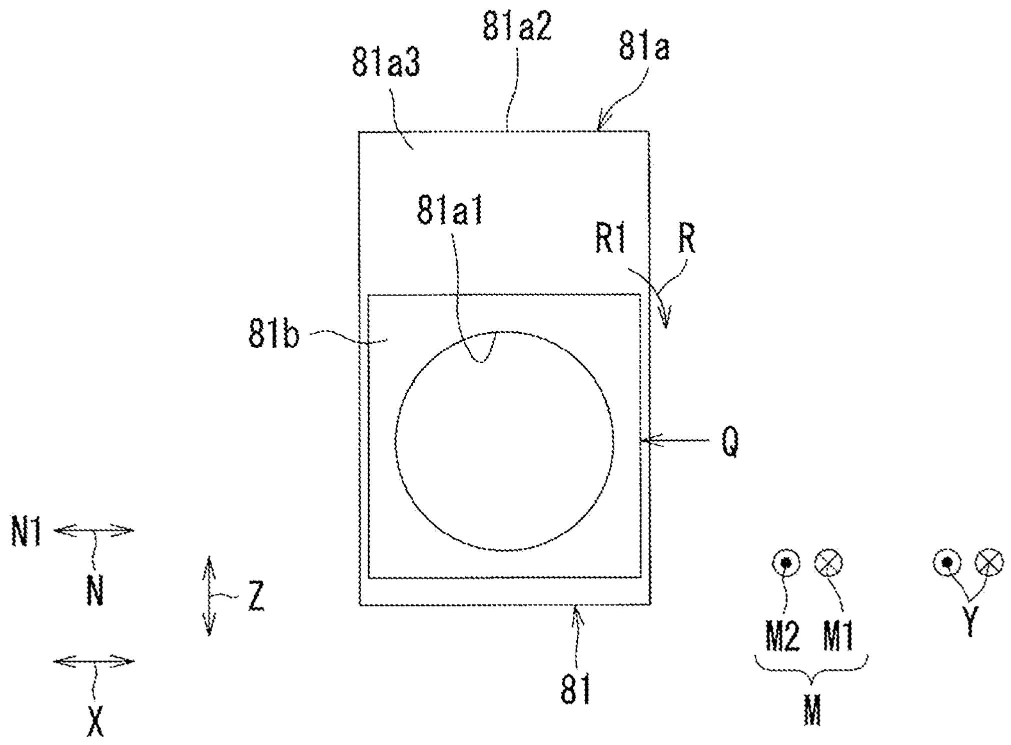
FIG. 9B is a front view illustrating the moving member.
Figure 9C:
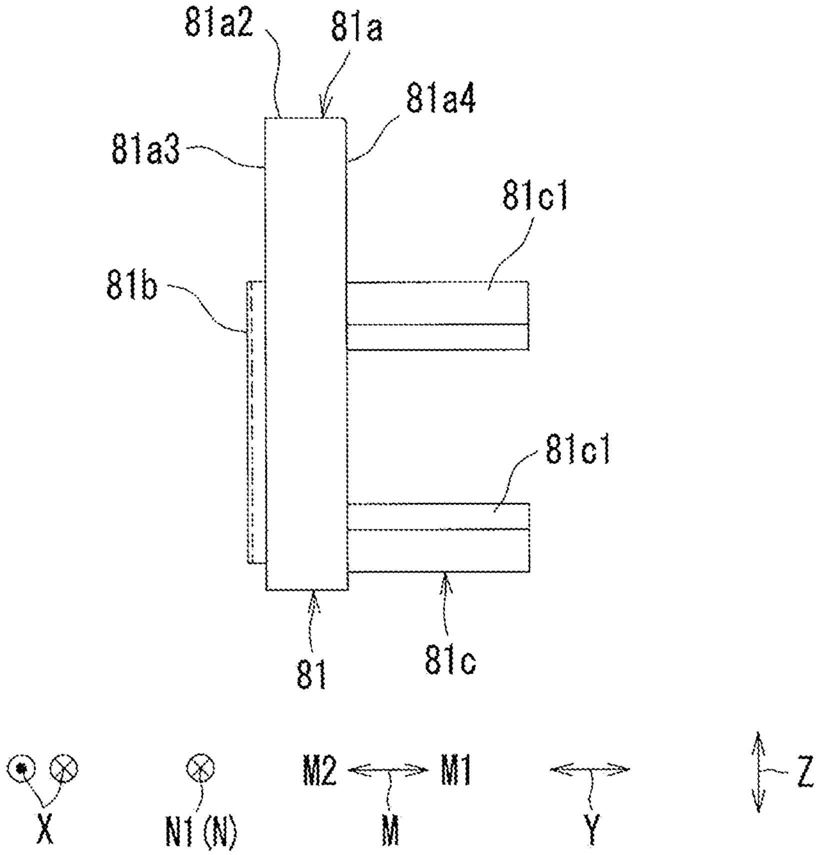
FIG. 9C is a side view illustrating the moving member.
Figure 9D:
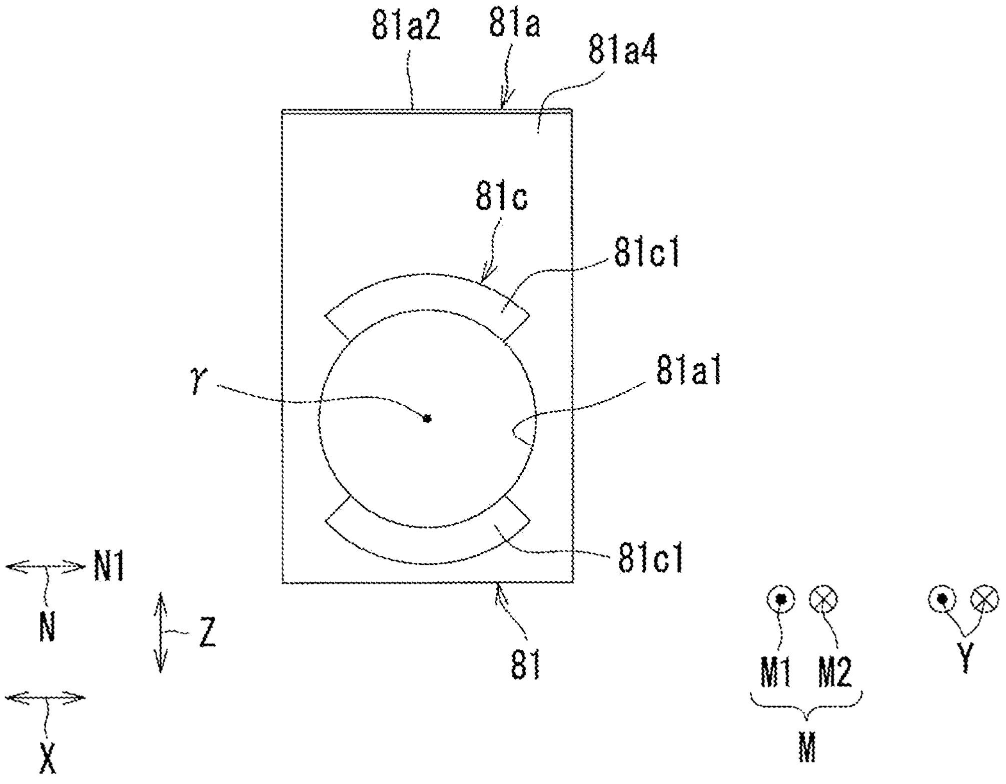
FIG. 9D is a back view illustrating the moving member.
Figure 9E:
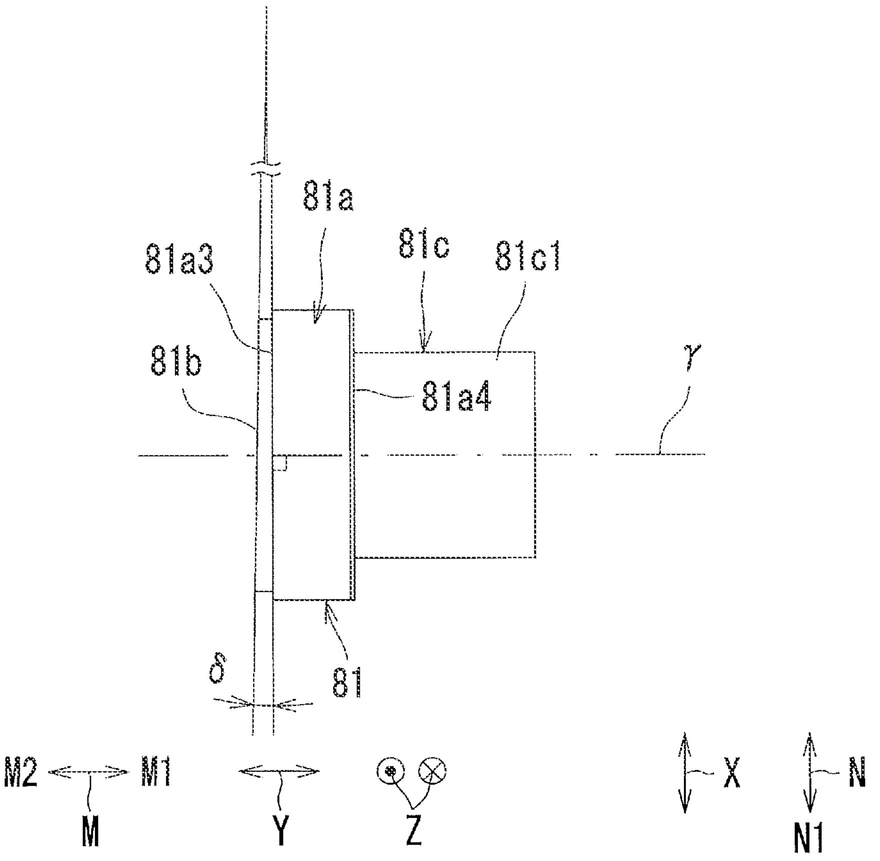
FIG. 9E is a bottom view illustrating the moving member.

FIG. 8A is a perspective view illustrating the edge regulating member 73. FIG. 8B is a front view of the edge regulating member 73 as seen from the first side M1 in the rotation axis direction M, and FIG. 8C is a back view of the edge regulating member 73 as seen from the second side M2. FIG. 8D is a side view of the edge regulating member 73. FIG. 8E is a cross-sectional view along taken line D-D in FIG. 8D.

Note that FIGS. 5A to 6A, FIG. 7A, and FIGS. 7D to 8E illustrate a configuration of the belt rotation device 70 on the first side M1 in the rotation axis direction M. The configuration of the belt rotation device 70 on the second side M2 in the rotation axis direction M is similar and thus is omitted from the drawings.

The belt rotation device 70 includes the belt 71, the plurality of belt tensioning rollers 72 to 72, and the edge regulating member 73 (collar member), and causes the belt 71 to rotate, tensioned by the belt tensioning rollers 72 to 72, in the rotation direction R. In this example, the belt tensioning rollers 72 to 72 include the transfer driving roller 721, the transfer driven roller 722, and a plurality of tension rollers 723 to 723.

The belt tensioning rollers 72 to 72 tension the belt 71 and cause the belt 71 to rotate in the rotation direction R. Rotary shafts 72*a*, 72*a* on either side of each belt tensioning roller 72 to 72 are supported in a rotatable manner by a pair of support members 20, 20 (body frame members) provided on the image forming device body 101. One roller (the transfer driving roller 721 in this example) of the belt tensioning rollers 72 to 72 is rotationally driven in a predetermined direction by a rotational driving force transferred from a rotation driver (drive motor; not illustrated) to the roller via a drive transfer mechanism (not illustrated). Another belt tensioning roller 72 (transfer driven roller 722) of the belt tensioning rollers 72 to 72 is rotationally driven by the rotational drive of the one belt tensioning roller 72 described above (transfer driving roller 721). In this manner, the belt 71 can be rotated in the rotation direction R (in this example, the direction from the image stations Pa, Pb, Pc, Pd toward the transfer nip portion TN).

The belt 71 is an endless belt and is wound around the belt tensioning rollers 72 to 72. In this example, the belt 71 is made of a flexible resin material such as polyimide.

The edge regulating member 73 is provided in a rotatable manner on the rotary shaft 72*a* of at least one belt tensioning roller 72 (in this example, the transfer driven roller 722) of the belt tensioning rollers 72 to 72. The edge regulating member 73 limits misalignment movement of the belt 71 in the rotation axis direction M of the belt tensioning rollers 72 to 72. In this example, the rotation axis direction M is aligned with the depth direction Y.

Each of the edge regulating members 73, 73 includes a body 731 and a regulating portion 732. The body 731 comes into contact with an inner surface 71*a* of the belt 71. The regulating portion 732 extends further outward in the radial direction of the belt tensioning roller 72 (722) than the body 731. The regulating portion 732 comes into contact with an edge 71*e* of the belt 71.

Specifically, the regulating portion 732 is formed as a flange extending from the body 731 and has a pressed portion 732*a* and a pressing portion 732*b*. The pressed portion 732*a* is pressed by the edge 71*e* of the belt 71. The pressing portion 732*b* presses a moving member 81 on a side opposite to the pressed portion 732*a* via an interposed member 83.

Belt Misalignment Correction Device 80

The belt rotation device 70 according to the first embodiment includes a belt misalignment correction device 80 that corrects misalignment of the belt 71. In the belt rotation device 70, the edge regulating member 73 is provided at either side (M1 and M2) of the belt tensioning roller 72 (722) in the rotation axis direction M on the rotary shaft 72*a*.

The belt misalignment correction device 80 includes, on either side (M1 and M2) of the belt tensioning roller 72 (722), the moving members 81, 81 and swinging portions 82 and 82. The moving members 81, 81 are provided, movable in the rotation axis direction M, further outward in the rotation axis direction M than the edge regulating members 73, 73 of the rotary shafts 72*a*, 72*a*. When the moving members 81, 81 are moved by the edge regulating members 73, 73 caused to move by the belt 71 misaligned outward in the rotation axis direction M, the swinging portions 82, 82 cause the belt tensioning roller 72 (722) to swing in a direction tilting the belt tensioning roller 72 (722) such that the belt 71 moves back inward (toward the center) in the rotation axis direction M.

The swinging portions 82, 82 each include a swinging support member 82*a*, a shaft receiving member 82*b*, and a biasing member 82*c* (a coil spring in this example) (see FIGS. 5A and 5B). The swinging support member 82*a* is supported on the support member 20 in a swingable manner about a swinging axis β aligned with a rotation axis α of the belt tensioning roller 72 (722). In addition, the swinging support member 82*a* supports the shaft receiving member 82*b* in a movable manner in a tension direction N (the left-and-right direction X in this example) of the belt 71. The shaft receiving member 82*b* supports the rotary shaft 72*a* of the belt tensioning roller 72 (722) in a rotatable manner. The biasing member 82*c* exerts a biasing force to the side opposite to the direction in which the belt tensioning roller 72 (722) tilts when the moving member 81 moves.

Specifically, the belt tensioning roller 72 (722) functions as a meandering correction roller that corrects meandering of the belt 71 by changing the tilt of the rotation axis α. The belt tensioning roller 72 (722) includes a barrel portion 72*b* and the pair of rotary shafts 72*a*, 72*a*. The barrel portion 72*b* is in contact with the inner surface 71*a* of the belt 71 and, in this example, has a smaller width than the belt 71. The rotary shafts 72*a*, 72*a* project in the rotation axis direction M from end portions of the barrel portion 72*b* on either side of the barrel portion 72*b*.

The rotary shafts 72*a*, 72*a* of the belt tensioning roller 72 (722) are each inserted into the edge regulating member 73, the moving member 81 (meandering correction collar member), and the shaft receiving member 82*b*. In this example, the rotary shafts 72*a*, 72*a* are cylindrical metal members with a constant diameter.

The edge regulating members 73, 73 are provided on the rotary shafts 72*a*, 72*a* in a rotatable manner about the rotation axis α and in a movable manner in the rotation axis direction M. In the rotation axis direction M of the belt tensioning roller 72 (722), the edge regulating members 73, 73 are pressed by the edge 71*e* of the outwardly misaligned belt 71 and caused to slide outward, thereby pressing the moving members 81, 81.

The moving member 81 is provided in a movable manner in the rotation axis direction M on the rotary shaft 72*a*. When pressed by the edge regulating member 73, the moving member 81 moves outward in the rotation axis direction M with respect to the rotary shaft 72*a*.

The support member 20 of the image forming device body 101 includes an inclined guide portion 20*a*. The inclined guide portion 20*a* comes into contact with the moving member 81, causing the moving member 81 to slide. The inclined guide portion 20*a* includes an inclined surface 20*a*1 inclined such that the inclined surface 20*a*1 approaches the rotation axis a with increasing distance from an inner edge 20*a*11 in the rotation axis direction M toward the an outer edge 20*a*12.

When the moving member 81 moves outward in the rotation axis direction M along the rotary shaft 72*a*, the moving member 81 comes into contact with the inclined guide portion 20*a* of the support member 20 and moves along the inclined guide portion 20*a*, tilting the belt tensioning roller 72 (722).

Specifically, the moving member 81 includes a moving member body 81*a*, a pressed portion 81*b*, and an engaged portion 81*c*. The moving member body 81*a* includes an insertion hole 81*a*1 (see FIG. 5B) into which the rotary shaft 72*a* is inserted, and a contact portion 81*a*2 (see FIG. 5B) that comes into contact with the inclined guide portion 20*a*.

The pressed portion 81*b* projects inward from an inner surface 81*a*3 (see FIG. 5B) in the rotation axis direction M of the moving member body 81*a* and is pressed against the pressing portion 732*b* of the edge regulating member 73 via the ring-shaped interposed member 83. The interposed member 83 facilitates sliding of the pressing portion 732*b* of the edge regulating member 73 rotated by the rotation of the belt 71 against the pressed portion 81*b* of the moving member 81. The interposed member 83 is made of a resin material with a smaller coefficient of friction than a predetermined reference coefficient of friction, such as that of fluororesin.

The engaged portion 81*c* projects outward from an outer surface 81*a*4 (see FIG. 5B) in the rotation axis direction M of the moving member body 81*a* and engages with the shaft receiving member 82*b* in a movable manner in the rotation axis direction M and a non-rotatable manner about the rotation axis α. In this example, the engaged portion 81*c* includes a pair of engaged pieces 81*c*1, 81*c*1 (see FIG. 5B) extending outward in the rotation axis direction M and opposing one another.

The support member 20 includes a swing shaft 22 protruding outward in the rotation axis direction M. The swinging support member 82*a* includes a through hole 82*a*1 into which the swing shaft 22 of the support member 20 is inserted.

The swinging support member 82*a* includes a slide hole 82*a*2 extending in the tension direction N and a take-out hole 82*a*3 that communicates with the slide hole 82*a*2. The size of the take-out hole 82*a*3 in an orthogonal direction h (the up-and-down direction Z in this example) orthogonal to both the rotation axis direction M and the tension direction N is greater than the size of the slide hole 82*a*2 in the orthogonal direction h.

The shaft receiving member 82*b* is supported in a movable manner in the tension direction N of the belt 71 with respect to the swinging support member 82*a*, but cannot move in the rotation axis direction M and cannot rotate about the rotation axis α. Specifically, the shaft receiving member 82*b* includes an insertion portion 82*b*1 and an engagement portion 82*b*2. The insertion portion 82*b*1 is inserted into the take-out hole 82*a*3. The size of the insertion portion 82*b*1 in the orthogonal direction h is less than the size of the take-out hole 82*a*3 in the orthogonal direction h and greater than the size of the slide hole 82*a*2 in the orthogonal direction h. Also, the insertion portion 82*b*1 includes engagement grooves 82*b*11, 82*b*11 (see FIG. 5B) that are formed along the tension direction N and engage with edges 82*a*21, 82*a*21 (see FIG. 5B) on either side of the slide hole 82*a*2 in the orthogonal direction h. Accordingly, the shaft receiving member 82*b* can move back and forth in the tension direction N in the slide hole 82*a*2.

The engagement portion 82*b*2 engages with the engaged portion 81*c* of the moving member 81. In this example, the engagement portion 82*b*2 includes a pair of engaged pieces 82*b*21, 82*b*21 (see FIG. 5B) that extend inward in the rotation axis direction M opposing one another in a manner allowing movement in the rotation axis direction M between the pair of engaged pieces 81*c*1, 81*c*1 of the moving member 81. Accordingly, the moving member 81 can move back and forth in the rotation axis direction M while engaged with the shaft receiving member 82*b*.

The biasing member 82*c* includes a first end portion 82*c*1 (see FIGS. 5A and 5B) connected to the swinging support member 82*a* and a second end portion 82*c*2 (see FIGS. 5A and 5B) connected to the support member 20.

In the present embodiment, the belt rotation device 70 further includes biasing members 74, 74 (in this example, coil springs). Each biasing member 74 biases the belt tensioning roller 72 (722) in a belt tension direction N1 (a direction opposite to the transfer driving roller 721 in this example), which is a tension direction of the belt 71. The biasing member 74 biases the belt tensioning roller 72 (722) in the belt tension direction N1.

Specifically, inside the slide hole 82*a*2 and the take-out hole 82*a*3, the biasing member 74 is disposed between the shaft receiving member 82*b* and an edge 82*a*31 (see FIG. 5A) of the take-out hole 82*a*3 on the side opposite to the belt tension direction N1 such that the shaft receiving member 82*b* is biased in the belt tension direction N1. Accordingly, the biasing member 74 can bias the belt tensioning roller 72 (722) in the belt tension direction N1.

In the belt misalignment correction device 80 described above, to correct outward misalignment of the rotating belt 71 toward the first side M1 in the rotation axis direction M, the edge regulating member 73 is pressed at the regulating portion 732 by the edge 71*e* of the belt 71 misaligned outward on the first side M1 in the rotation axis direction M, thereby pressing the moving member 81 at the pressing portion 732*b*. The moving member 81 is moved outward in the rotation axis direction M by being pressed by the edge regulating member 73, and the contact portion 81*a*2 comes into contact with the inclined surface 20*a*1 of the inclined guide portion 20*a*. When the moving member 81 moves further outward in the rotation axis direction M, the contact portion 81*a*2 slides against the inclined surface 20*a*1. Then, as the moving member 81 slides against the inclined surface 20*a*1, the moving member 81 is subject to, from the inclined surface 20*a*1, a reaction force including a component toward a first side h1 (downward direction in this example) in the orthogonal direction h. Accordingly, the rotary shaft 72*a* at one end of the belt tensioning roller 72 (722) is forced toward the first side h1 in the orthogonal direction h by the reaction force from the inclined surface 20*a*1 via the moving member 81, and the rotation axis α tilts in the reaction force direction. When the rotation axis a of the belt tensioning roller 72 (722) tilts in this way, a force that returns the belt 71 inward in the rotation axis direction M acts on the belt 71 and moves the belt 71 toward the second side M2 in the rotation axis direction M. Accordingly, outward misalignment of the belt 71 on the first side M1 in the rotation axis direction M is corrected. Outward misalignment of the rotating belt 71 on the second side M2 in the rotation axis direction M is corrected in a similar manner.

That is, outward misalignment of the rotating belt 71 in the rotation axis direction M is corrected by causing the belt 71 to meander to the first side M1 or the second side M2 in the rotation axis direction M.

However, the belt 71 may become damaged when the edge 71*e* of the belt 71 slides against the regulating portion 732 of the edge regulating member 73. To reduce the load on the edge 71*e* of the belt 71 when the edge 71*e* slides against the regulating portion 732 of the edge regulating member 73, sliding friction between the regulating portion 732 and the edge 71*e* of the belt 71 caused when the belt 71 is misaligned needs to be maximally reduced. However, known configurations such as that described in PTL 1 are too complex.

First Embodiment

In the present embodiment, the edge regulating member 73 that regulates misalignment movement of the belt 71 in the rotation axis direction M of the belt tensioning roller 72 (722) is provided in a rotatable manner on the rotary shaft 72*a* of the belt tensioning roller 72 (722). This makes the configuration simple.

Also, as illustrated in FIG. 7D, the regulating portion 732 of the edge regulating member 73 tilts, turned outward in the rotation axis direction M from the fold-back portion Q (see FIGS. 3A and 5B) of the belt 71 toward an upstream side R1 in the rotation direction R due to the tension acting on the body 731 by the belt 71 while the inner surface 71*a* of the belt 71 is in contact with the body 731. That is, the rotating belt 71 misaligned in the rotation axis direction M can be brought into contact with the body 731 before the regulating portion 732. At this time, since the belt 71 is wrapped around the body 731, the edge 71*e* of the belt 71 can be stabilized because the belt 71 is wrapped around the body 731. Also, since the regulating portion 732 tilts, turned outward in the rotation axis direction M, thereafter, even when the belt 71 becomes further misaligned and comes into contact with the regulating portion 732, the edge 71*e* of the belt 71 is stabilized due to the belt 71 being wrapped around the body 731, and the belt 71 can be rotated while making point contact or roughly point contact instead of line contact with the regulating portion 732. Accordingly, sliding friction between the regulating portion 732 and the edge 71*e* of the belt 71 when the belt 71 is misaligned can be maximally reduced. Also, damage caused by the edge 71*e* of the belt 71 running up onto the regulating portion 732 can be prevented.

In the present embodiment, as illustrated in FIG. 7D, at an inner peripheral surface 73*a* of the edge regulating member 73 opposing the rotary shaft 72*a*, a first inner diameter ø1 of an inner end 73*b* in the rotation axis direction M is greater than a second inner diameter ø2 of an outer end 73*c* in the rotation axis direction M.

With this configuration, when the inner surface 71*a* of the belt 71 is in contact with the body 731, the regulating portion 732 can be easily tilted with a simple configuration.

In this embodiment, as illustrated in FIG. 7D, the inner peripheral surface 73*a* of the edge regulating member 73 opposing the rotary shaft 72*a* has an inclined surface 733 inclined such that the inclined surface 733 gradually approaches the rotation axis $\alpha$ of the belt tensioning roller 72 (722) with increasing distance from the inner end 73*b* toward the outer end 73*c*.

As described above, the inner peripheral surface 73*a* of the edge regulating member 73 has the inclined surface 733. Thus, the rotary shaft 72*a* (in the present embodiment, a first rotary shaft 72*a*1 with a constant diameter, for example) with a simple and widely used configuration can be employed, and the regulating portion 732 can be reliably tilted due to the inclined surface 733 of the edge regulating member 73 rotated by the rotation of the belt 71 while the body 731 is stably rotated when the inner surface 71*a* of the belt 71 is in contact with the body 731.

This configuration will be described in more detail with reference to FIG. 7D. As illustrated in FIG. 7D, the belt 71 on the belt tension direction N1 side of the belt tensioning roller 72 (722) corresponds to the fold-back portion Q of the belt 71. While the belt 71 on the upstream side in the rotation direction R from the fold-back portion Q cannot be illustrated in FIG. 7D because FIG. 7D is a cross-sectional view, the belt 71 on the upstream side is present at the same projection position as the belt 71 on the advancing side at which the belt 71 is sent off from the belt tensioning roller 72 (722) illustrated in FIG. 7D. That is, the edge 71*e* of the belt 71 visible on the side opposite to the belt tension direction N1 from a contact point between the edge 71*e* of the belt 71 and the pressed portion 732*a* at the fold-back portion Q may be considered the edge position of the belt 71 on the entry side. That is, the regulating portion 732 is tilted at an angle $\eta$ (see FIG. 7D) with respect to the edge 71*e* of the belt 71 on the entry side due to the tension of the belt 71 acting on the body 731. Thus, the edge 71*e* of the belt 71 does not come into contact with the regulating portion 732 on the entry side of the belt 71 of the belt tensioning roller 72 (722) but does come into contact with the regulating portion 732 at the fold-back portion Q.

In this embodiment, as illustrated in FIG. 7D, the belt rotation device 70 has a gap D between the edge regulating member 73 and the rotary shaft 72*a* (72*a*1). In the gap D, a first gap (ø1-ø3) (ø3 being the outer diameter of the rotary shaft 72*a* (72*a*1)) at the inner end 73*b* in the rotation axis direction M is greater than a second gap (ø2-ø3) at the outer end 73*c* in the rotation axis direction M. Here, a second inner diameter ø2 is equal to or greater than an outer diameter ø3 of the rotary shaft 72*a*.

In this example, the following relationship is satisfied, where d is the fit tolerance for the rotary shaft 72*a* (72*a*1) and the edge regulating member 73.

ø1-ø3>ø2-ø3 (where ø1-ø3 is 200 μm in this example)

ø2-ø3<*d* (where *d* is 50 μm in this example)

Since the first gap (ø1-ø3) at the inner end 73*b* is greater than the second gap (ø2-ø3) at the outer end 73*c*, the regulating portion 732 can be easily tilted with a simple configuration when the inner surface 71*a* of the belt 71 is in contact with the body 731.

In the present embodiment, the gap D gradually decreases with increasing distance from the first gap (ø1-ø3) toward the second gap (ø2-ø3).

With this configuration, the rotary shaft 72*a* (in the present embodiment, the first rotary shaft 72*a*1 with a constant diameter, for example) with a simple and widely used configuration can be employed, and the regulating portion 732 can be smoothly tilted when the inner surface 71*a* of the belt 71 is in contact with the body 731.

As illustrated in FIG. 7D, when an outer diameter ø4 of the body 731 of the edge regulating member 73 is equal to or less than an outer diameter ø5 (>ø3) of the barrel portion 72*b* of the belt tensioning roller 72 (722) that comes into contact with the inner surface 71*a* of the belt 71, even when the inner surface 71*a* of the belt 71 is in contact with the body 731, it may be difficult for the belt 71 to press the body 731 toward the rotation axis $\alpha$ with the tension and it may be difficult for the regulating portion 732 to tilt in response to the tension of the belt 71 acting on the body 731.

In this regard, in the belt rotation device 70 of the present embodiment, the outer diameter ø4 of the body 731 of the edge regulating member 73 is greater than the outer diameter ø5 of the barrel portion 72*b* that comes into contact with the inner surface 71*a* of the belt 71 of the belt tensioning roller 72 (722).

With this configuration, when the inner surface 71*a* of the belt 71 is in contact with the body 731, the belt 71, via tension, can easily press the body 731 toward the rotation axis $\alpha$. Accordingly, the regulating portion 732 can be easily tilted by the tension of the belt 71 on the body 731, allowing the regulating portion 732 to be reliably tilted.

However, if the outer diameter ø4 of the body 731 is greater than the outer diameter ø5 of the barrel portion 72*b* by too much, a step in the direction orthogonal to the rotation axis $\alpha$ occurring between the barrel portion 72*b* and the body 731 may become too large and the belt 71 may bend.

In this regard, in the present embodiment, the outer diameter ø4 of the body 731 is greater (ø5-ø4≤ø1-ø3) than the outer diameter ø5 of the barrel portion 72*b* by a distance equal to or less than the first gap (ø1-ø3).

With this configuration, when the body 731 is pressed by the tension of the belt 71 toward the rotation axis $\alpha$, the step in the direction orthogonal to the rotation axis $\alpha$ occurring between the barrel portion 72*b* and the body 731 does not cause an excessive curve in the belt 71.

Also, since the belt rotation device 70 includes the belt misalignment correction device 80 that corrects misalignment of the belt 71, misalignment of the belt 71 can be corrected while sliding friction between the regulating portion 732 and the edge 71*e* of the belt 71 when the belt 71 is misaligned can be maximally reduced.

Second Embodiment

FIGS. 9A to 9E are a perspective view, a front view, a side view, a back view, and a bottom view, respectively, illustrating the moving member 81.

The belt rotation device 70 according to the second embodiment includes the configuration of the belt rotation device 70 according to the first embodiment. That is, for the belt rotation device 70 according to the second embodiment, configurations similar to those of the belt rotation device 70 according to the first embodiment are given the same reference signs, and the description will focus on differences from the belt rotation device 70 according to the first embodiment.

In the belt misalignment correction device 80, when the belt 71 is misaligned, the belt 71 comes into contact with the regulating portion 732 of the edge regulating member 73, and the edge regulating member 73 moves together with the belt 71. Then, the moving member 81 also moves together with the belt 71 and the edge regulating member 73. At this time, the regulating portion 732 of the edge regulating member 73 in contact with the moving member 81 tilts, turned outward in the rotation axis direction M due to the tension of the belt 71. However, for example, when a contact surface 81*b*1 of the moving member 81 that comes into contact with the regulating portion 732 is aligned with the rotation direction R (an edge surface 71*e*1 of the belt 71 (see FIG. 7D)), that is, a direction orthogonal to the rotation axis direction M and the belt 71 becomes misaligned and comes into contact with the regulating portion 732 of the edge regulating member 73 to move the edge regulating member 73 in the rotation axis direction M and cause the edge regulating member 73 to come into contact with the contact surface 81*b*1 of the moving member 81, the contact reaction force of the contact surface 81*b*1 of the moving member 81 makes it difficult for the regulating portion 732 to tilt outward in the rotation axis direction M.

In this regard, in the present embodiment, the contact surface 81*b*1 of the moving member 81 that comes into contact with the regulating portion 732 of the edge regulating member 73 is an inclined surface (see FIGS. 9A and 9E) inclined, turned outward in the rotation axis direction M from the fold-back portion Q of the belt 71 toward the upstream side R1 in the rotation direction R. In other words, the contact surface 81*b*1 corresponds to an inclined surface inclined by δ (see FIG. 9E) from the belt tension direction N1 by the belt tensioning roller 72 (722) with respect to a surface orthogonal to a center axis line γ (parallel with the rotation axis α of the belt tensioning roller 72 (722)) of the insertion hole 81*a*1, that is, the inner surface 81*a*3 of the moving member body 81*a* in the rotation axis direction M.

With this configuration, when the belt 71 becomes misaligned and comes into contact with the regulating portion 732 of the edge regulating member 73 to move the edge regulating member 73 in the rotation axis direction M and cause the edge regulating member 73 to come into contact with the contact surface 81*b*1 of the moving member 81, the pressing portion 732*b* of the edge regulating member 73 comes into contact with the contact surface 81*b*1 while inclined along the contact surface 81*b*1, allowing the regulating portion 732 to be tilted outward in the rotation axis direction M. Accordingly, the regulating portion 732 can be easily tilted outward in the rotation axis direction M, allowing the regulating portion 732 to be reliably tilted.

Third Embodiment

Figure 10:
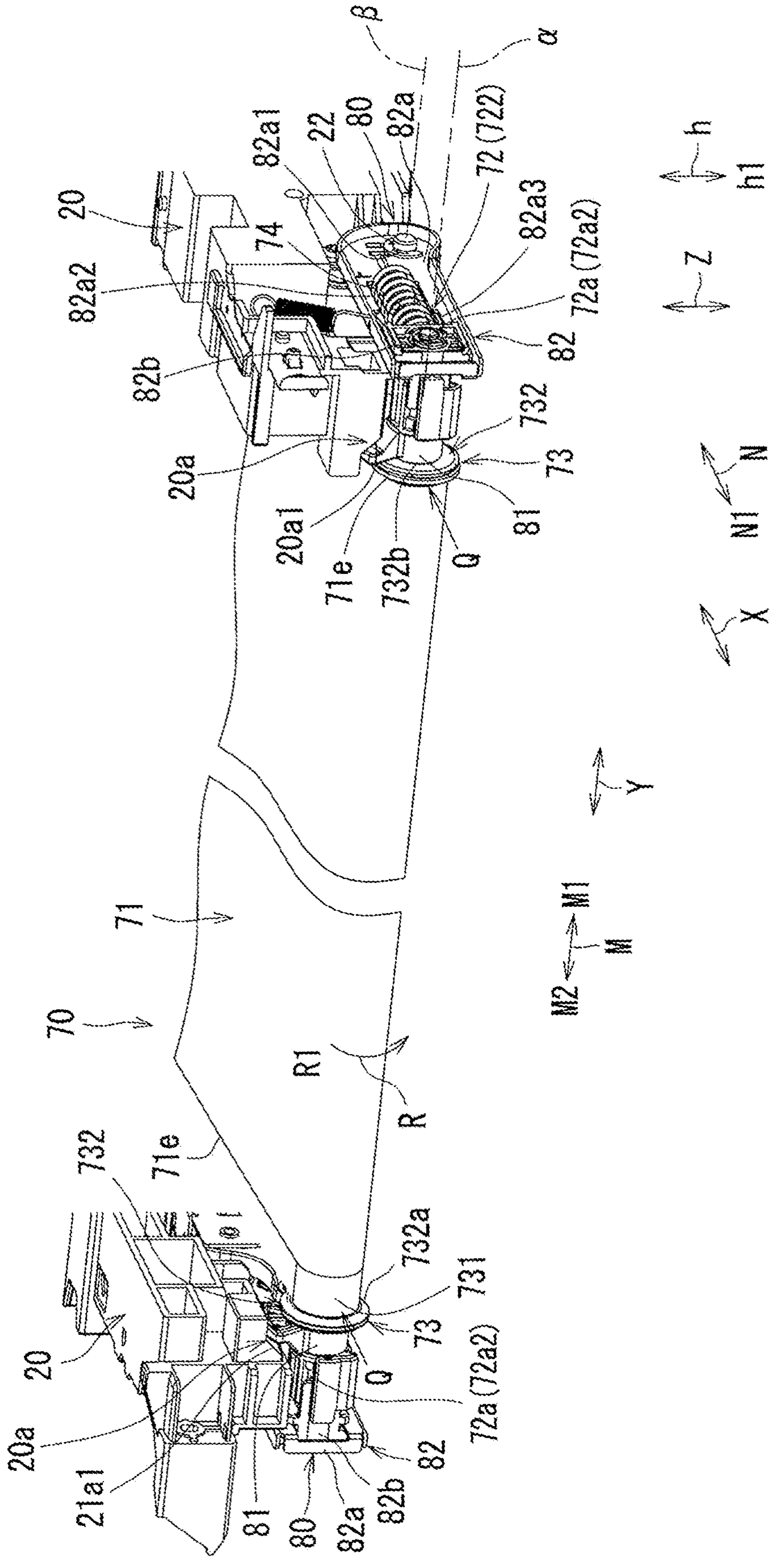
FIG. 10 is a perspective view illustrating misalignment movement of the belt at the first side in the rotation axis direction at the belt tensioning roller portion on the side opposite to the secondary transfer device in the left-and-right direction of the belt rotation device according to a third embodiment.

FIG. 10 is a perspective view illustrating misalignment movement of the belt 71 at the first side M1 (front side) in a rotation axis direction M at the belt tensioning roller 72 (722) portion on the side opposite to the secondary transfer device 11 in the left-and-right direction X of the belt rotation device 70 according to a third embodiment.

Figure 11:
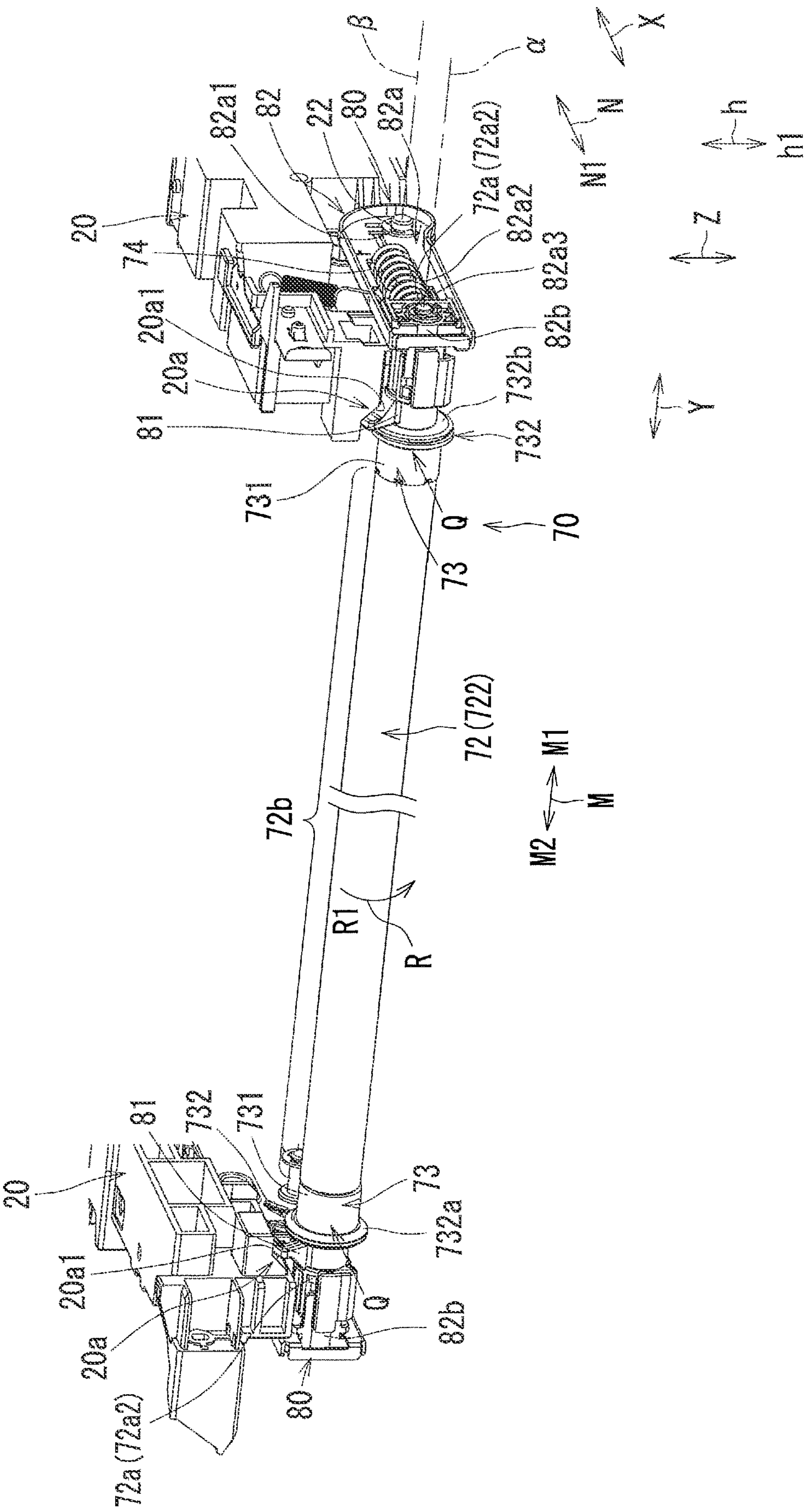
FIG. 11 is a perspective view illustrating the belt rotation device illustrated in FIG. 10 with the belt removed.

FIG. 11 is a perspective view illustrating the belt rotation device 70 illustrated in FIG. 10 with the belt 71 removed.

Figure 12A:
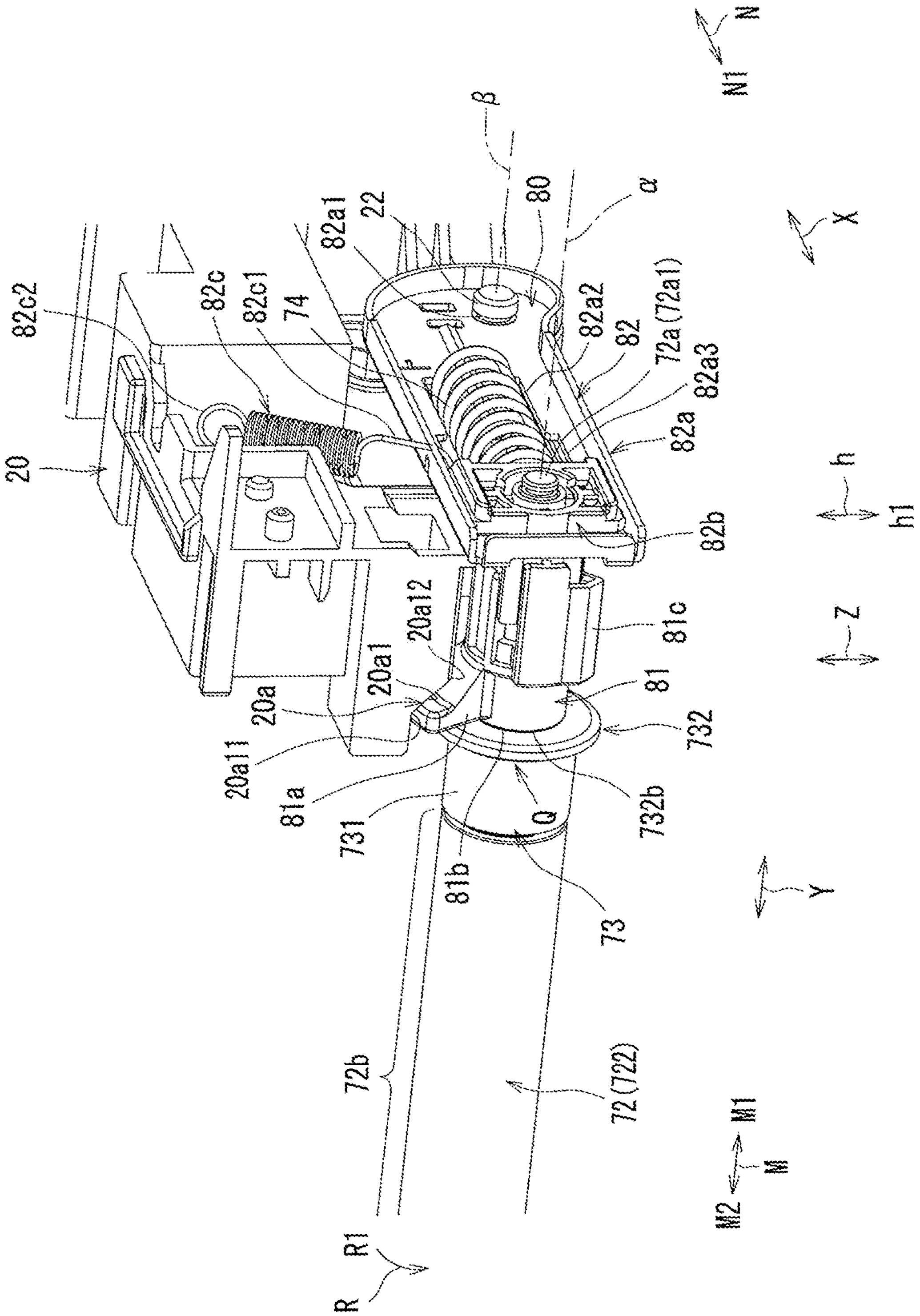
FIG. 12A is a magnified perspective view illustrating the edge regulating member portion of the belt rotation device illustrated in FIG. 11 on the first side in the rotation axis direction.
Figure 12B:
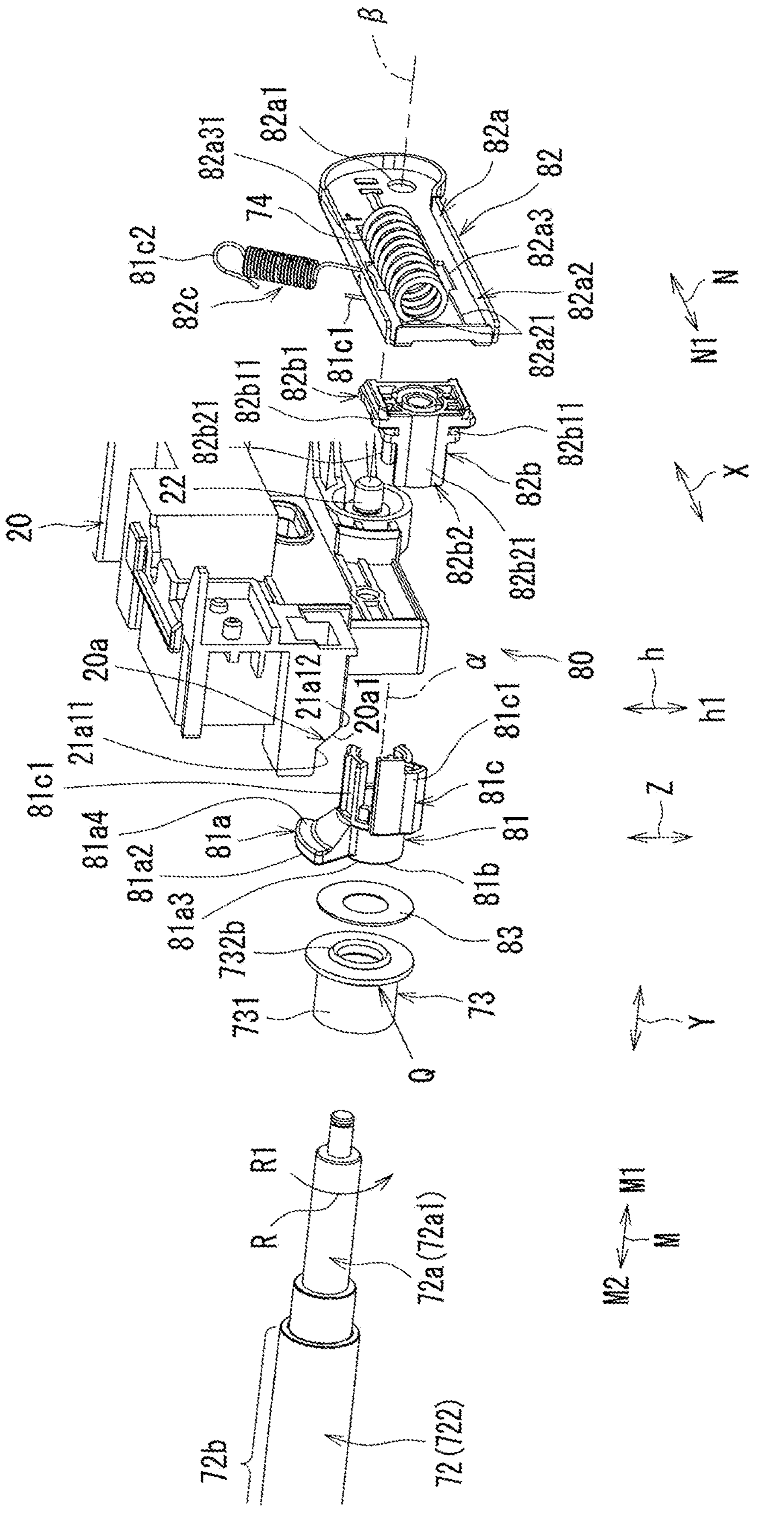
FIG. 12B is a magnified exploded perspective view illustrating the edge regulating member portion of the belt rotation device illustrated in FIG. 11 on the first side in the rotation axis direction.

FIGS. 12A and 12B are a magnified perspective view and a magnified exploded perspective view, respectively, illustrating the edge regulating member 73 portion of the belt rotation device 70 illustrated in FIG. 11 on the first side M1 in the rotation axis direction M.

Figure 13:
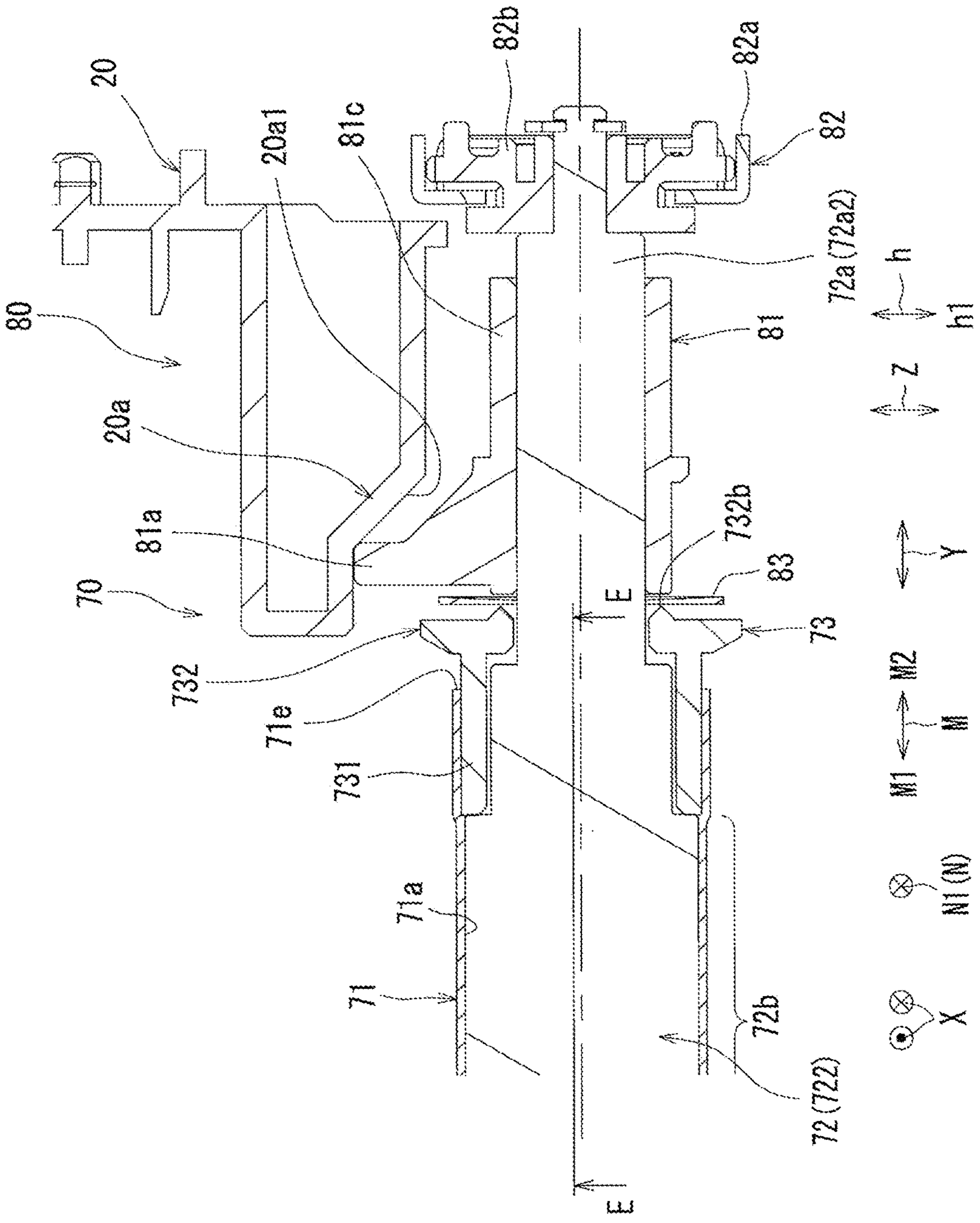
FIG. 13 is a magnified cross-sectional view of the edge regulating member portion on the first side in the rotation axis direction.
Figure 14:
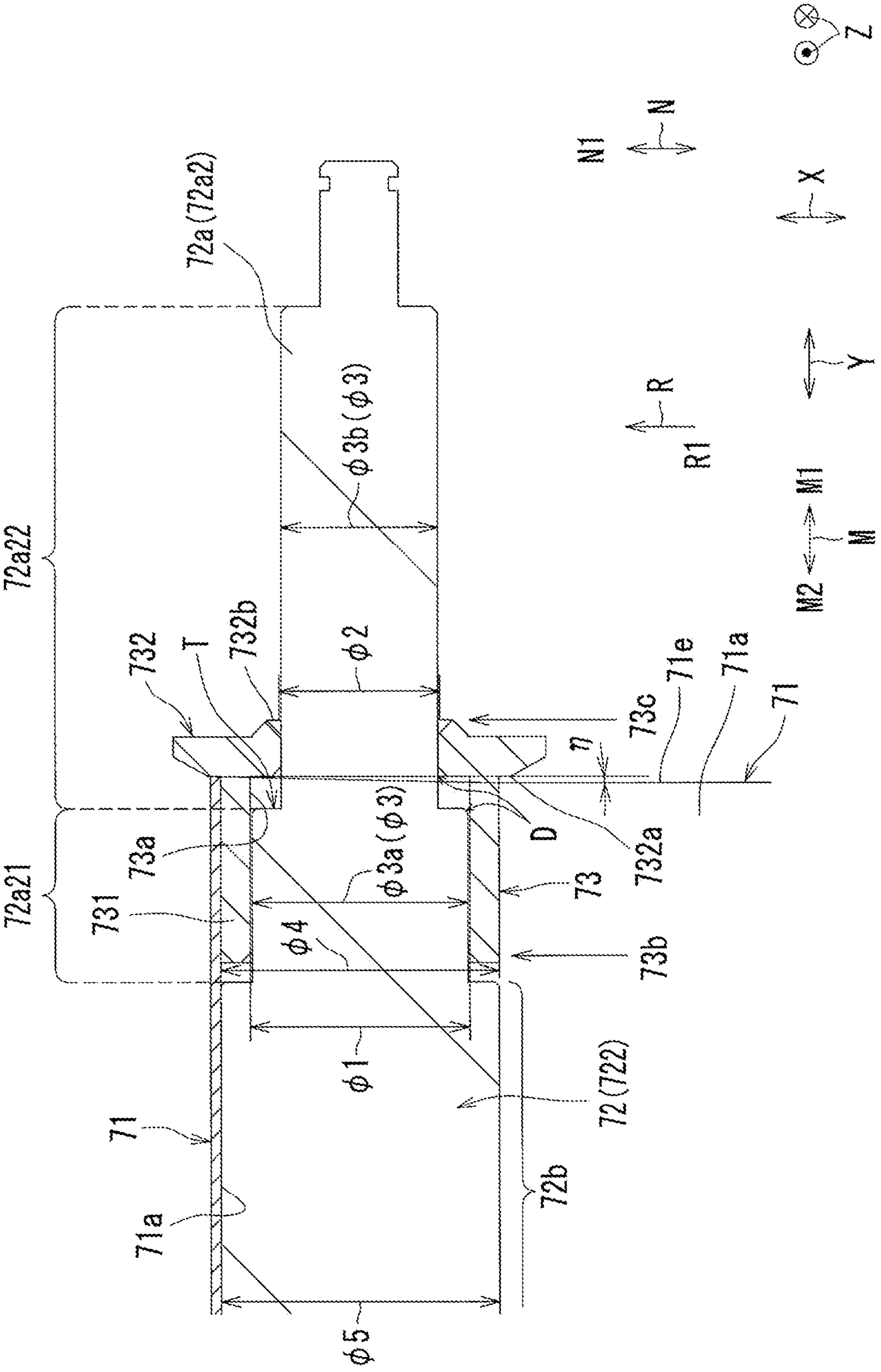
FIG. 14 is a cross-sectional view taken along line E-E in FIG. 13.

FIG. 13 is a magnified cross-sectional view of the edge regulating member 73 portion on the first side M1 in the rotation axis direction M. FIG. 14 is a cross-sectional view taken along line E-E in FIG. 13, in other words, is a view as seen from the upper surface side of the belt tensioning roller 72 (722), that is, the entry side of the belt 71. Accordingly, the belt 71 on the advancing side at which the belt 71 is sent off from the belt tensioning roller 72 (722) is visible at a position below the belt tensioning roller 72 (722).

Note that FIGS. 12A to 14 illustrate the configuration of the belt rotation device 70 on the first side M1 in the rotation axis direction M. The configuration of the belt rotation device 70 on the second side M2 in the rotation axis direction M is similar and thus is omitted from the drawings.

The belt rotation device 70 according to the third embodiment includes the configuration of the belt rotation device 70 according to the first embodiment and the second embodiment. That is, for the belt rotation device 70 according to the third embodiment, configurations similar to those of the belt rotation device 70 according to the first embodiment and the second embodiment are given the same reference signs, and the description will focus on differences from the belt rotation device 70 according to the first embodiment and the second embodiment.

The edge regulating members 73, 73 provided in the belt rotation device 70 according to the third embodiment are cylindrical members with the constant first inner diameter ø1 and the constant second inner diameter ø2. This will be explained in more detail below.

As illustrated in FIG. 14, at the inner peripheral surface 73*a* of the edge regulating member 73 opposing the rotary shaft 72*a*, the first inner diameter ø1 of the inner end 73*b* in the rotation axis direction M is set greater than the second inner diameter ø2 of the outer end 73*c* in the rotation axis direction M.

On the other hand, the rotary shaft 72*a* of the belt tensioning roller 72 (722) where the edge regulating member 73 is disposed includes a first shaft portion 72*a*21 with a first outer diameter ø3*a* (ø3) smaller than the outer diameter ø5 of the barrel portion 72*b* at a position corresponding to the first inner diameter ø1 portion, and a second shaft portion 72*a*22 with a second outer diameter ø3*b* (ø3) smaller than the first outer diameter ø3*a* at a position corresponding to the second inner diameter ø2 portion. The boundary portion between the first shaft portion 72*a*21 and the second shaft portion 72*a*22 forms a step T.

The second inner diameter ø2 of the edge regulating member 73 is equal to or greater than the second outer diameter ø3*b* of the second shaft portion 72*a*22, and the first inner diameter ø1 of the edge regulating member 73 is greater than the first outer diameter ø3*a* of the first shaft portion 72*a*21. That is, the gap D between the inner peripheral surface 73*a* of the edge regulating member 73 and the belt tensioning roller 72 (722) is set such that the first gap (ø1-ø3*a* (ø3)) is greater than the second gap (ø2-ø3*b* (ø3)). In other words, the fit tolerance of the second gap is set greater than (looser than) the fit tolerance of the first gap.

With the configuration described above, when the inner surface 71*a* of the belt 71 is in contact with the body 731 of the edge regulating member 73 and the tension of the belt 71 acts on the body 731, since the second gap is smaller than the first gap, in the second gap region, the edge regulating member 73 comes into contact with the rotary shaft 72*a* of the belt tensioning roller 72 (722) and the body 731 tilts in the tension direction of the belt 71 with the contact region acting as a fulcrum. At this time, the regulating portion 732 of the edge regulating member 73 on the entry side of the belt 71 tilts outward. In other words, as illustrated in FIG. 14, the regulating portion 732 tilts, turned outward in the rotation axis direction M from the fold-back portion Q of the belt 71 toward the upstream side R1 in the rotation direction R (of the belt 71) due to the tension of the belt 71 acting on the body 731. (As illustrated in FIG. 14, the belt 71 on the belt tension direction N1 side of the belt tensioning roller 72 (722) corresponds to the fold-back portion Q of the belt 71. While the belt 71 on the upstream side R1 in the rotation direction R from the fold-back portion Q cannot be illustrated in FIG. 14 because FIG. 14 is a cross-sectional view, the belt 71 on the upstream side R1 is present at the same projection position as the belt 71 on the advancing side at which the belt 71 is sent off from the belt tensioning roller 72 (722) illustrated in FIG. 14. That is, the edge 71*e* of the belt 71 visible at the side opposite to the belt tension direction N1 from a contact point between the edge 71*e* of the belt 71 and the pressed portion 732*a* at the fold-back portion Q may be considered the edge position of the belt 71 on the entry side. Also, the regulating portion 732 is tilted at the angle η with respect to the edge 71*e* of the belt 71 on the entry side. Thus, the edge 71*e* of the belt 71 does not come into contact with the regulating portion 732 on the entry side of the belt 71 but does come into contact with the regulating portion 732 at the fold-back portion Q.)

In the present embodiment, the gap D is designed to decrease in a stepwise manner from the first gap (ø1-ø3*a* (ø3)) toward the second gap (ø2-ø3*b* (ø3)).

With this configuration, when the inner surface 71*a* of the belt 71 is in contact with the body 731, the regulating portion 732 can be easily tilted with a simple configuration.

As described above, the rotary shaft 72*a* (72*a*2) includes the step T between the first inner diameter ø1 and the second inner diameter ø2 in a state where the edge regulating member 73 is provided. Thus, the edge regulating member 73 (for example, a cylindrical member with the constant first inner diameter ø1 and the constant second inner diameter ø2 in the present embodiment) with a simple and widely used configuration can be employed, and the regulating portion 732 can be reliably tilted while the body 731 is stably rotated at a portion inward (the first shaft portion 72*a*21) from the step T of the rotary shaft 72*a* (72*a*2) of the belt tensioning roller 72 (722) rotated by the rotation of the belt 71 when the inner surface 71*a* of the belt 71 is in contact with the body 731. In other words, the regulating portion 732 can be tilted such that the entry side of the belt 71 turns outward, that is, the distance from the edge 71*e* of the belt 71 increases closer to the upstream side R1 of the rotation direction R of the belt 71. Accordingly, the edge 71*e* can be effectively prevented from running up onto the regulating portion 732 when the belt 71 enters the belt tensioning roller 72 (722), and damage caused by the edge 71*e* running up onto the regulating portion 732 can be effectively prevented.

OTHER EMBODIMENTS

In the first embodiment to the third embodiment, the belt rotation device 70 is applied to a primary transfer belt device 19. However, the belt rotation device 70 may be applied to any device with a belt, such as a secondary transfer belt device with a secondary transfer belt, a fixing belt device with a fixing belt, or a conveyor belt device with a conveyor belt.

The disclosure is not limited to the embodiments described above and can be implemented in various other forms. Thus, the above embodiments are merely examples in all respects and should not be interpreted as limiting. The scope of the disclosure is indicated by the claims and is not limited to the description. Furthermore, all modifications and changes equivalent in scope with the claims are included in the scope of the disclosure.

REFERENCE SIGNS LIST

100 Image forming device
19 Primary transfer belt device
20 Support member
20*a* Inclined guide portion
20*a*1 Inclined surface
20*a*11 Inner edge
20*a*12 Outer edge
22 Swing shaft
70 Belt rotation device
71 Belt
71*a* Inner surface
71*e* Edge
71*e*1 End surface
72 Belt tensioning roller
721 Transfer driving roller
722 Transfer driven roller
723 Tension roller
72*a* Rotary shaft
72*a*1 First rotary shaft
72*a*2 Second rotary shaft
72*a*21 First shaft portion
72*a*22 Second shaft portion
72*b* Barrel portion
73 Edge regulating member
731 Body
732 Regulating portion
732*a* Pressed portion
732*b* Pressing portion
733 Inclined surface
73*a* Inner peripheral surface
73*b* Inner end
73*c* Outer end
74 Biasing member
80 Belt misalignment correction device
81 Moving member
81*a* Moving member body
81*b* Pressed portion
81*c* Engaged portion
82 Swinging portion
82*a* Swinging support member
82*b* Shaft receiving member
82*c* Biasing member

83 Interposed member
D Gap
M Rotation axis direction
M1 First side
M2 Second side
N Tension direction
N1 Belt tension direction
Q Fold-back portion
R Rotation direction
R1 Upstream side
T Step
X Left-and-right direction
Y Depth direction
Z Up-and-down direction
h Orthogonal direction
h1 First side
α Rotation axis
β Swinging axis
ø1 First inner diameter of edge regulating member
ø2 Second inner diameter of edge regulating member
ø3 Outer diameter of rotary shaft
ø3*a* First outer diameter of rotary shaft
ø3*b* Second outer diameter of rotary shaft
ø4 Outer diameter of body of edge regulating member
ø5 Outer diameter of barrel portion of belt tensioning roller

The invention claimed is:

1. An edge regulating member included in a belt rotation device that tensions a belt via a belt tensioning roller and rotates the belt in a rotation direction, the edge regulating member being provided in a rotatable manner on a rotary shaft of the belt tensioning roller to regulate misaligned movements of the belt in a rotation axis direction of the belt tensioning roller, the edge regulating member comprising:
a body that comes into contact with an inner surface of the belt; and
a regulating portion that extends, at a position adjacent to the body, further outward in a radial direction of the belt tensioning roller than the body and comes into contact with an edge of the belt,
wherein tension of the belt acting on the body, while the inner surface of the belt is in contact with the body, causes the regulating portion to tilt and turn outward in the rotation axis direction from a fold-back portion of the belt toward an upstream side in the rotation direction, and
at an inner peripheral surface opposite the rotary shaft, a first inner diameter of an inner end of the edge regulating member in the rotation axis direction is greater than a second inner diameter of an outer end of the edge regulating member in the rotation axis direction.

2. The edge regulating member according to claim 1,
wherein the inner peripheral surface includes an inclined surface inclined such that the inclined surface gradually approaches a rotation axis of the belt tensioning roller with increasing distance from the inner end toward the outer end.

3. The edge regulating member according to claim 1,
wherein the rotary shaft includes a step between the inner end and the outer end in a state where the edge regulating member is provided.

4. A belt rotation device, comprising:
a belt;
a belt tensioning roller that tensions the belt and rotates the belt in a rotation direction; and
an edge regulating member provided in a rotatable manner on a rotary shaft of the belt tensioning roller to regulate misaligned movements of the belt in a rotation axis direction of the belt tensioning roller,
wherein the edge regulating member includes:
a body that comes into contact with an inner surface of the belt, and
a regulating portion that extends further outward in a radial direction of the belt tensioning roller than the body and comes into contact with an edge of the belt,
tension of the belt acting on the body, while the inner surface of the belt is in contact with the body, causes the regulating portion to tilt and turn outward in the rotation axis direction from a fold-back portion of the belt toward an upstream side in the rotation direction,
a gap is provided between the edge regulating member and the rotary shaft, and
at the gap, a first gap at an inner end in the rotation axis direction is greater than a second gap at an outer end in the rotation axis direction.

5. The belt rotation device according to claim 4,
wherein the gap gradually decreases with increasing distance from the first gap toward the second gap.

6. The belt rotation device according to claim 4,
wherein the gap decreases in a stepwise manner from the first gap toward the second gap.

7. The belt rotation device according to claim 4,
wherein an outer diameter of the body of the edge regulating member is greater than an outer diameter of a barrel portion of the belt tensioning roller that comes into contact with the inner surface of the belt.

8. The belt rotation device according to claim 7,
wherein the outer diameter of the body is greater than the outer diameter of the barrel portion by a distance less than or equal to the first gap.

9. An image forming device, comprising:
the belt rotation device according to claim 4.

10. A belt rotation device comprising:
a belt;
a belt tensioning roller that tensions the belt and rotates the belt in a rotation direction;
an edge regulating member provided in a rotatable manner on a rotary shaft of the belt tensioning roller to regulate misaligned movements of the belt in a rotation axis direction of the belt tensioning roller; and
a belt misalignment correction device that corrects the misaligned movements of the belt,
wherein the edge regulating member includes:
a body that comes into contact with an inner surface of the belt, and
a regulating portion that extends further outward in a radial direction of the belt tensioning roller than the body and comes into contact with an edge of the belt,
tension of the belt acting on the body, while the inner surface of the belt is in contact with the body, causes the regulating portion to tilt and turn outward in the rotation axis direction from a fold-back portion of the belt toward an upstream side in the rotation direction,
the edge regulating member is provided on either side of the rotary shaft of the belt tensioning roller in the rotation axis direction, and
the belt misalignment correction device includes, at the either side of the belt tensioning roller:
a moving member that is provided in a movable manner in the rotation axis direction, the moving member being provided further outward than the edge regulating member of the rotary shaft in the rotation axis direction, and a swinging portion that, when the moving member is moved by the edge regulating member caused to move by the belt misaligned outward in the rotation axis direction, causes the belt tensioning roller to swing in a direction tilting the belt tensioning roller such that the belt moves inward in the rotation axis direction.

11. The belt rotation device according to claim 10, wherein a contact surface of the moving member that comes into contact with the regulating portion of the edge regulating member is an inclined surface inclined and turn outward in the rotation axis direction from a fold-back portion of the belt toward an upstream side in the rotation direction.

12. The belt rotation device according to claim 10, wherein a gap is provided between the edge regulating member and the rotary shaft, and at the gap, a first gap at an inner end in the rotation axis direction is greater than a second gap at an outer end in the rotation axis direction.

13. The belt rotation device according to claim 12, wherein the gap gradually decreases with increasing distance from the first gap toward the second gap.

14. The belt rotation device according to claim 12, wherein the gap decreases in a stepwise manner from the first gap toward the second gap.

15. The belt rotation device according to claim 12, wherein an outer diameter of the body of the edge regulating member is greater than an outer diameter of a barrel portion of the belt tensioning roller that comes into contact with the inner surface of the belt.

16. The belt rotation device according to claim 15, wherein the outer diameter of the body is greater than the outer diameter of the barrel portion by a distance less than or equal to the first gap.

17. An image forming device, comprising:

the belt rotation device according to claim 10.

* * * * *